(12) United States Patent
Durrant

(10) Patent No.: US 6,604,931 B2
(45) Date of Patent: Aug. 12, 2003

(54) BI-AXIAL ROTATIONAL MOLDING OVEN

(76) Inventor: Richard A Durrant, 2391 Jonesville Hwy., Union, SC (US) 29379

( * ) Notice: Subject to any disclaimer, the term of this patent is extended or adjusted under 35 U.S.C. 154(b) by 52 days.

(21) Appl. No.: 09/845,973

(22) Filed: Apr. 30, 2001

(65) Prior Publication Data

US 2002/0187213 A1 Dec. 12, 2002

(51) Int. Cl.$^7$ ............................................. B29C 41/06
(52) U.S. Cl. ..................... 425/429; 425/425; 425/435; 425/162
(58) Field of Search ................................. 425/425, 434, 425/435, 429, 430, 162

(56) References Cited

U.S. PATENT DOCUMENTS

| | | | |
|---|---|---|---|
| 3,337,662 A | * 8/1967 | Spencer | 264/71 |
| 3,474,165 A | * 10/1969 | Rakes et al. | 264/312 |
| 3,703,348 A | 11/1972 | Pivar | 425/173 |
| 3,734,665 A | * 5/1973 | Guillaud | 425/174 |
| 3,796,533 A | 3/1974 | Vox | 425/429 |
| 3,810,727 A | 5/1974 | Pivar | 425/144 |
| 3,822,980 A | 7/1974 | Graeper | 425/429 |
| 3,825,395 A | 7/1974 | Pivar | 425/435 |
| 3,841,821 A | 10/1974 | Pivar | 425/434 |
| 3,885,016 A | 5/1975 | Pivar | 264/269 |
| 3,914,105 A | 10/1975 | Pivar | 425/435 |
| 3,938,928 A | 2/1976 | Andrews, deceased | 425/430 |
| 4,022,564 A | 5/1977 | Dawson | 425/430 |
| 4,102,624 A | 7/1978 | Corona | 425/429 |
| 4,486,172 A | 12/1984 | Dunning | 432/11 |
| 4,583,932 A | 4/1986 | Meuret | 425/182 |
| 4,632,654 A | 12/1986 | Lemelson | 425/150 |
| 4,767,321 A | 8/1988 | Chilva | 432/59 |
| 4,836,963 A | 6/1989 | Gilman, Jr. | 264/45.7 |
| 5,039,297 A | 8/1991 | Masters | 425/429 |
| 5,116,213 A | 5/1992 | Zilbert | 425/183 |
| 5,316,701 A | * 5/1994 | Payne | 264/1.24 |
| 5,423,248 A | 6/1995 | Smith et al. | 99/443 C |
| 5,443,382 A | 8/1995 | Tsurumi et al. | 432/59 |
| 5,507,632 A | 4/1996 | Payne | 425/4 R |
| 5,554,394 A | 9/1996 | Feal et al. | 425/434 |
| 5,683,240 A | 11/1997 | Smith | 432/59 |
| 5,705,200 A | 1/1998 | Payne | 425/4 R |
| 5,807,589 A | 9/1998 | Defatte | 425/186 |

* cited by examiner

*Primary Examiner*—Robert Davis
*Assistant Examiner*—Joseph S. Del Sole
(74) *Attorney, Agent, or Firm*—Michael I Kroll

(57) ABSTRACT

A rotational molding oven for forming an object from a mold containing resin therein. The oven includes a cavity receiving the mold therein and a combustion chamber for providing heat inside of the cavity. A spool is rotatively positioned within the cavity, the sides of which spool substantially form the sides of the cavity, and a drive tube engages the mold and extends between first and second flanged disks of the spool. A first motor is positioned outside the cavity and rotates the spool and a second motor is positioned outside the cavity and rotates the mold within the spool. Heat in the cavity melts the resin within the mold and rotating the spool and mold by the first and second motors causes the melted resin to be evenly distributed throughout the mold. The drive tube may be selectively positioned at a peripheral edge or at a center of the spool.

18 Claims, 19 Drawing Sheets

BI-AXIAL ROTATIONAL MOLDING OVEN

BACKGROUND OF THE INVENTION

1. Field of the Invention

The present invention relates generally to ovens and, more specifically, to a rotational molding oven able to be operated in a bi-axial rotational mode, a rock and roll mode or both, wherein the mold is both heated and cooled evenly by the oven with resin evenly distributed throughout to manufacture a primarily hollow or a partial shell object.

2. Description of the Prior Art

Numerous types of ovens as well as numerous methods and apparatus for forming an object have been disclosed in the prior art. One such example of a method used for forming an object is rotational molding. Rotational molding is a method of manufacture for forming primarily hollow or partial shaped plastic objects. This process utilizes a shell mold having a cavity bounded on five sides by the mold. The sixth side of the cavity is formed by a cover attached by clamps or bolts to one of the adjacent sides. When the cover to the mold is open, a powdered (possibly colored) plastic resin is placed into the cavity of the mold. The cover is then sealed to restrict access to the cavity and the mold is placed in a heated environment in which it is rotated about two axes. The heat causes the resin to melt against the inside surface of the mold. The melted resin flows within the cavity to form a viscous membrane conforming to the mold's inner surface. The mold (and the plastic inside) is then cooled while rotation continues causing the resin to harden in the shape of the cavity filled thereby.

When the hardened resin is cool enough to handle (normally below 150° F.) the rotation is stopped and the mold opened. The hardened resin forming a desired part is removed. The part is then trimmed and cut to the desired final contour(s) for the part. These parts are generally of uniform wall thickness, colored throughout, and unstressed, (i.e. the parts will not deform if subject to cyclical heat or heating/cooling).

Rotation can be either complete revolutions about two axes or complete revolutions about a primary axis (y) with partial revolutions about a secondary axis (x). The latter motion is called "rock and roll" as the partial revolutions look somewhat like a cradle being rocked. In both cases, the two axes of rotation are mutually perpendicular, rotation about the vertical axis (relative to the mold centerline when the centerline is horizontal) is not required.

The quality of the part produced is heavily dependant upon motion controls exercised during both the heating cycle and the cooling cycle. The progress of the mold through the heated cavity must distribute the resin evenly and at the same time expose the surfaces of the mold to the oven heat in a uniform manner regardless of the irregularity of the surface. Therefore the motion must be configured to the specific mold and be subject to total control.

For most ovens the rotations are at a fixed rate. This provides for all exposed sides to be treated equally. The direction of rotation is also fixed for several cycles between reversals. In bi-axial, turret and shuttle machines it is possible to slow down or speed up the rotation but not reverse it in mid cycle. In rock and roll machines some angles of rotation are out of range. The present invention overcomes these limitations by providing a controlled rotation with mid revolution pause, reversal or speed change for the second axis (the x axis) and reversal and speed change for the primary axis (the y axis). It is possible to simulate either a bi-axial oven or a rock and roll oven by setting suitable limits. It is also possible to create a more complex rotational pattern by using multiple stop-start and speed change options.

Furthermore, U.S. Pat. Nos. 5,705,200; 5,807,589; 5,554,394; 5,507,632; 5,116,213; 5,039,297; 4,836,963; 4,632,654; 4,583,932; 4,102,624; 4,022,564; 3,938,928; 4,486,172; 4,767,321; 5,423,248; 5,683,240; 5,443,382; 3,914,105; 3,885,016; 3,841,821; 3,825,395; 3,822,980; 3,810,727; 3,796,533; and 3,703,348 all are illustrative of such prior art. While these units may be suitable for the particular purpose to which they address, they would not be as suitable for the purposes of the present invention as heretofore described.

U.S. Pat. No. 5,705,200

Inventor: LeRoy Payne

Issued: Jan. 6, 1998

A method of continuously forming an integrally molded structure in a multiaxis rotational molding operation includes the steps of rotating a multisection mold assembly about at least three axes. A first freshly formed polymerizable mixture is flowed over surfaces of an enclosed mold cavity within the multisection mold assembly. The flowing of the first mixture over the mold cavity surfaces and formation of a first resin therefrom is monitored. A second freshly formed polymerizable mixture is flowed under pressure through an orifice into the mold cavity. A liquid stream of the second mixture is formed. The liquid stream is gelled as it advances through the mold cavity to form a continuous filament with structural integrity. The filament is contacted with the first resin formed within the mold cavity. The filament is distributed over the first resin in a preselected pattern. A third freshly formed polymerizable mixture is flowed over the filament pattern formed within the mold cavity with the second mixture. The flowing of the third mixture and formation of a third resin therefrom is monitored. The rotation of the multisection mold assembly is continued throughout the steps of the continuous molding operation while monitoring individually each axis rotation of the multisection mold assembly. The monitored flowing of each mixture and the monitored formation of each resin with each monitored axis rotation is coordinated in a preselected profile to form the integrally molded structure of the first, second and third resins. Also, apparatus forming the structure is included.

U.S. Pat. No. 5,807,589

Inventor: Robert G. Defatte

Issued: Sep. 15, 1998

A screw with replaceable threads is particularly useful to releasably join the spiders of rotational molding machines. The screw comprises a master bolt that passes through a first spider, and a tip that is removably assembled to the master bolt. The tip is threaded to selectively engage and disengage a receiver on the second spider. When the tip is assembled to the master bolt, the screw is captured in the first spider. When the tip has worn through use, it can be replaced without disturbing the master bolt. Similarly, when the tip seizes to the receiver, the tip and receiver are replaceable as a unit without disturbing the master bolt.

U.S. Pat. No. 5,554,394

Inventor: Joseph Feal

Issued: Sep. 10, 1996

A molding apparatus is provided which consists of three frames which are relatively pivotal with respect to one another. One frame (A) is cradled in a second frame (B) and provision is made for tilting the first frame relative to the frame in which it is cradled. The cradling frame and the frame cradled therein are made tiltable relative to third frame (C). The tilting operations are effected by hydraulic piston and cylinder arrangements (170, 176). The method of the invention consists of cradling the first frame in a second frame, tilting the first frame relative to the second frame to a certain angle of inclination and thereafter tilting the cradling second frame along with the cradled first frame therein to a second angle of inclination relative to the third frame.

U.S. Pat. No. 5,507,632

Inventor: Leroy Payne

Issued: Apr. 16, 1996

Multi-axis rotational molding apparatus includes a support portion, a molding portion, a mixing portion and a control portion. The support portion includes an arm member disposed in a generally horizontal orientation and having one end extending from an upstanding supporting section. The molding portion includes a mold supporting assembly pivotally connected to a free end of the arm member and an independently rotatable mold connector section. The mold supporting assembly includes a central passage therethrough from a pivotal connection with the arm member and through the mold connector section. A mold assembly includes at least two separable mold sections forming a substantially enclosed cavity. The mixing portion includes an elongated section extending axially within the central passage through the mold supporting assembly adjacent the mold connector section. The mixing section includes a plurality of deflector sections disposed along the length thereof. A plurality of inlet conduits extends along the arm member and is operatively connected to an inlet end of the mixing section. A hollow probe member extends from an outlet end of the mixing section into the cavity of the mold assembly. The control portion includes actuators rotating the mold connector section and the mold assembly affixed thereto and actuators pivoting the mold supporting assembly and the mold assembly affixed thereto with respect to the arm member, a programmable memory, a coordinator, monitors and circuitry.

U.S. Pat. No. 5,116,213

Inventor: Seymour Zilbert

Issued: May 26, 1992

Apparatus for selectively rotationally molding an industrial drum in either a closed-head configuration or an open-head configuration within a mold constructed for selective modification to accomplish molding of the drum in either selected configuration by inserting or deleting a separator between a first mold cavity for forming the body of the drum and a further mold cavity for forming the head of the drum, the further mold cavity being selected from alternate second and third mold cavities, such that both the body and the head are rotationally molded simultaneously within the mold during molding of either configuration of the industrial drum.

U.S. Pat. No. 5,039,297

Inventor: William E. Masters

Issued: Aug. 13, 1991

Rotational molding apparatus for molding a kayak and the like in a mold (12). The apparatus includes an oven (A) having an oven chamber (40). A frame (B) pivotally supports oven (A) above a ground floor (10). Mold (12) rotates about a roll axis (123) on a carriage (C) while in oven chamber (40). Oven (A) pivots about a pivot axis (72) in counter-pivotal movement. Oven pivot axis (72) is spaced a distance "d" from roll axis (123) of mold (12). This causes a pendular motion to be imparted to the mold (12). Mold (12) thus swings to and fro in an arc as oven (A) pivots. Mold (12) rotates about its roll axis (123) at the same time. A well-controlled, even distribution of plastic material in the mold occurs by this combination of motions. A desired pattern of heat distribution is applied along the length of mold (12) by a series of hot air openings (50a–50d) and a like number of openings on an opposing side of a hot air plenum (49).

U.S. Pat. No. 4,836,963

Inventor: Llewellyn A. Gilman, Jr.

Issued: Jun. 6, 1989

An improved rotational molding method for making a laminated plastic structure of the type in which successive charges of particulate plastics are released in a mold cavity rotating in an oven to coalesce successively along the mold cavity wall after which the mold is removed from the oven for cooling. By removing the rotating mold from the oven prior to completion of the formation of the inside layer, cooling of the outside of the mold will be concurrent with coalescence of the inside layer. This shortens the time of the molding cycle and reduces warping problems.

U.S. Pat. No. 4,632,654

Inventor: Jerome H. Lemelson

Issued: Dec. 30, 1986

Rotational molding apparatus and methods for rotationally molding castable material such as polymers and other materials. In one form, a shuttle or wheeled carriage containing a mold fixture for holding one or more molds, which fixture is both pivotable and rotatable on the carriage, is operable to move along a fixed path into and out of an oven and a cooling chamber. Two of such mold fixture containing carriages may be automatically moved between the oven and one or more cooling chambers, alternately to permit the oven and cooling chamber or chambers to be operated substantially all of the time during an operating shift. An automatic programming device or computer operates to control the movement of the carriage or carriages into and out of the oven and cooling chamber, the operations of the fixture rotating and pivoting motors and, if utilized, the operation of automatic mold charging equipment, the cooling chamber water pumps, the oven heating elements, mold opening and closing means, molded article removal equipment, etc. In a particular form, mold containing carriages alternately move into the oven and cooling chamber along a single track wherein one carriage is either sidetracked or moved to the side of the single track while the other carriage travels between the oven and cooling chamber.

U.S. Pat. No. 4,583,932

Inventor: Paul V. Meuret

Issued: Apr. 22, 1986

A rotational moulding machine comprising a heat-insulated enclosure mounted to rotate on a frame about a substantially horizontal axis, which enclosure comprises means for receiving and driving in rotation at least one mould about an axis perpendicular to the axis of rotation of the enclosure, wherein said enclosure further comprises, inside, radiating elements located in front of the walls of the enclosure whose radiations are reflected by reflector means towards the central part of the enclosure where the mould is located in order to heat said mould by radiation.

U.S. Pat. No. 4,102,624

Inventor: Peter J. Corona

Issued: Jul. 25, 1978

An apparatus and process is disclosed for rotational molding. Rotational molding is a technique for the fabrication of parts from powdered thermoplastic material in which the thermoplastic material is placed within a hollow mold and the mold is rotated in a heated environment until the thermoplastic material fuses and coats the entire interior surface of the mold. Included in the apparatus is a holding mechanism for the mold and a power mechanism to provide the required rotational motion to the mold. The power mechanism provides for simultaneous rotation of the mold about two orthogonal axes and is displaced spatially from the holding mechanism. The holding mechanism is attached to a translating mechanism which positions the molds both internal to and external to a heating chamber such as an oven while keeping the drive mechanism external of the oven at all times. More specifically there is disclosed an apparatus which includes a truck mounted upon a guiding track and having extending therefrom an arm mechanism. The arm is pivotally attached to the truck and is coupled thereto in such a manner that the arm may be translated about the pivotal point through a vertical path from a horizontal position at a loading/unloading (mold rework) station through approximately 180° to be positioned into a heating chamber at a heating station and a cooling chamber or tower at a cooling station for fabrication of the molded part. Subsequently, thereto the mold attached to the arm may be repositioned at the mold rework station for the removal of the plastic part from the mold. Automatic control mechanisms and interlocks are provided to enable safety measures to be exercised to prevent movement of the truck along the track except at specified times and when the arm is in appropriate position to clear the oven and cooling towers.

U.S. Pat. No. 4,022,564

Inventor: John Dawson

Issued: May 10, 1977

A molding apparatus which is provided with a frame including a bar acting as a mold support. The bar is pivoted between two angular limits and carries a gear wheel to be pivoted therewith. Planetary gears are engaged with the gear wheel and are displaced pivotally around the gear wheel to be rotated by the same. Molds are coupled to the planetary gears to be rotated therewith. Heating devices are located below the molds to heat the molds as they are being rotated simultaneously about their axes and about the axis of the gear wheel.

U.S. Pat. No. 3,938,928

Inventor: Alvadore M. Andrews, deceased

Issued: Feb. 17, 1976

A rotary casting apparatus for molding hollow articles of synthetic plastic is described employing a plurality of hollow molds which are heated and rotated within a fixed oven. The molds and molded articles therein are cooled rapidly while they remain within the oven by injecting cool, moist air into such oven from an external blower fan and a sprayer which sprays water into the air inlet of such fan. Improved rotation and support means are provided for the molds, including a common tubular drive shaft which rotates all of the molds about a common axis and a plurality of rotor means for rotating each of the molds about another axis perpendicular to such common axis. The rotor means are coupled by bevel gears to a second drive shaft extending through the common drive shaft. Each of the molds is rotationally mounted on bearings which are supported on the common drive shaft. The bearings at the inner ends of the molds each include a tubular fixed shaft about which the mold is rotated by the rotor means and which also vents gas from such mold. A scraper ring of low adhesion material is attached to the fixed bearing shaft within each mold and spaced a predetermined distance from its inner surface to provide the molded article with a mounting flange portion of predetermined thickness and inner diameter.

U.S. Pat. No. 4,486,172

Inventor: Leonard A. Dunning

Issued: Dec. 4, 1984

The present invention is an oven and method of operation for heating thermoplastic articles. Articles are fed into the oven on a conveyor belt. There is a heating plate directly beneath the article bearing surface of the conveyor belt which heats the supported side of the article. The surface of the article not in contact with the belt is heated by conventional means within the oven.

U.S. Pat. No. 4,767,321

Inventor: Timothy E. Chilva

Issued: Aug. 30, 1988

A method and apparatus for heating fibers reinforced thermoplastic sheets is disclosed. The apparatus involves use of gas heating ovens adapted to allow several layers of material to be heated continuously, with the conveyors stacked are above the other. Stacking of the heated product can be provided at the oven exit. Provisions for cleaning and diffusing the gases over the work piece are also described.

U.S. Pat. No. 5,423,248

Inventors: Donald P. Smith, et al.

Issued: Jun. 13, 1995

A method and apparatus for heating a product which includes a plurality of tapered ducts in a cabinet above and below a conveyor to form streams which are directed toward the product. Spent air is drawn through return ducts which have intake openings centered between entrance and exit openings in the cabinet and centered between lateral edges of a conveyor and between the tapered ducts to provide a balanced flow of spent air in the cabinet to the return opening. Temperature controlled gas is delivered at an angle through an array of openings adjacent opposite edges of an opening through which a conveyor extends to cause most of the heated air to be drawn to the return duct opening and to maintain internal pressure in the cabinet to prevent ingress and egress of air through the opening.

U.S. Pat. No. 5,683,240

Inventor: Donald P. Smith

Issued: Nov. 4, 1997

A method and apparatus for heating a product which includes a plurality of tapered ducts in a cabinet above and below a conveyor to form streams which are directed toward the product. Spent air is drawn through return ducts which have intake openings centered between entrance and exit openings in the cabinet and centered between lateral edges of a conveyor and between the tapered ducts to provide a balanced flow of spent air in the cabinet to the return opening. Temperature controlled gas is delivered at an angle through an array of openings adjacent opposite edges of an opening through which a conveyor extends to cause most of the heated air to be drawn to the return duct opening and to maintain internal pressure in the cabinet to prevent ingress and egress of air through the opening.

U.S. Pat. No. 5,443,382

Inventor: Koichi Tsurumi, et. al.

Issued: Aug. 22, 1995

An atmospheric oven containing an atmospheric gas kept at a predetermined purity accommodates a transport for transporting an object to be heated along a predetermined transporting path. A rectangular sectioned tubular body for preventing the gas from flowing outside the oven extends a certain length from an entrance of the oven Sand an exit of the oven and has a sectional area necessary for passing the object through the tubular body.

U.S. Pat. No. 3,914,105

Inventor: Stuart Pivar

Issued: Oct. 21, 1975

Apparatus is provided for the molding of a hollow article from a thermoplastic material. This apparatus includes a hollow mold including first and second complementary mold parts having a common axis of rotation. The mold parts are provided with engageable edges at which the parts abut to seal the mold against the leakage of the thermoplastic material. These engageable edges may take the form of flanges which are perpendicular to the axis of rotation of the mold. A rotation mechanism is provided to support one of the parts and to rotate the same on the axis of rotation. A releasable clamp is provided to clamp the other of the two parts releasably against the rotated part such that the two parts rotate together when the clamp is effecting a clamping force thereon.

U.S. Pat. No. 3,885,016

Inventor: Stewart Pivar

Issued: May 20, 1975

The process of the invention is provided for molding hollow articles from thermoplastic materials. The process comprises depositing a measured amount of thermoplastic material in a hollow metal mold having a side and bottom walls and rotating this mold about a horizontal axis while simultaneously heating the mold during its rotation until a layer of partially fused material is formed against the side wall thereof. The mold is then pivoted to an attitude which is inclined approximately forty-five degrees to the horizontal and the mold is heated in this attitude for an additional period of time until a layer of partially fused material is formed against the bottom wall. The heating of the mold is continued until at least substantially all the material is fused, whereafter the mold is cooled and the thusly molded article is removed from the mold. The article of the invention is an open container prepared in accordance with the aforegoing method.

U.S. Pat. No. 3,841,821

Inventor: Stuart Pivar

Issued: Oct. 15, 1974

A technique is provided for molding a plurality of pan-shaped plastic articles simultaneously. This is done by arranging open pan-shaped molds coaxially along an inclined axis with a rectangular frame supported on shafts inclined at about 45°. Plastic poured into the individual molds is fused by a burner arranged below the frame and parallel to said axis.

U.S. Pat. No. 3,825,395

Inventor: Stewart Pivar

Issued: Jul. 23, 1974

Apparatus for molding hollow plastic articles in which a mold is simultaneously rotated about two mutually perpendicular axes, a source of heat being located at a position generally radially displaced relative to a circle described by the mold. The mold is supported in a frame which is of adjustable size, there being provided a telescopic drive for rotating the mold and which is extensible to accommodate adjustments in the frame.

U.S. Pat. No. 3,822,980

Inventor: Michael R. Graeper

Issued: Jul. 9, 1974

Rotational molding apparatus including a mold-carrying frame which is mounted on a track for movement between a mold-working station and an oven. The oven is rotatable under power about a substantially horizontal axis and has a door on one of its sides. With the oven in one position, the door faces toward the mold-working station. The mold-carrying frame may be moved along the track and directly into or out of the oven through the doorway. With the door closed a substantially totally enclosed chamber is provided in the oven. Ducts in the oven are operable to circulate heated air about a mold rotated in the oven. The oven and mold frame may be rotated about the oven axis in either of reverse directions. The mold frame also is adapted to be rotated within the oven in either of reverse directions about an axis disposed at a substantial angle to the oven axis. The mold-working station includes an enclosure having a movable top which may be moved between a position overlying the mold in the station and a position where it is spaced laterally of the mold.

U.S. Pat. No. 3,810,727

Inventor: Stewart Pivar

Issued: May 14, 1974

Apparatus for molding hollow plastic articles in which a mold is simultaneously rotated about two mutually perpendicular axes, a source of heat being located at a position generally radially displaced relative to a circle described by the mold. The mold is supported in a frame which is of adjustable size, there being provided a telescopic drive for rotating the mold and which is extensible to accommodate adjustments in the frame. In the above-indicated apparatus as well as apparatus of the same type, the mold will generally have a profile such that the relative spacing between the mold and source of heat will vary during relative movement therebetween. To provide thermal compensation for the tendency of the relative spacing to change, there is provided a cam rotatable with the mold and having a profile corresponding with the profile of the mold which controls either the flame of the burner constituting the source of heat or the physical location of the burner relative to the mold or both. The control is effected through a series of servo mechanisms controlled by a cam follower.

U.S. Pat. No. 3,796,533

Inventor: Anton J. Vox

Issued: Mar. 12, 1974

A rotary molding machine for producing articles of plastic which comprises at least one rotary frame of a shape similar to that of a so-called gyrowheel or Rhonwheel which is driven about a horizontal main axis and is supported on rollers and in which a table or the like is rotatably mounted on which a mold is to be supported and which together with the mold is driven about an axis extending transversely to the main axis. By employing such a rotary frame, it is possible to mount molds on the rotary frame which far exceed the dimensions of the molds which could previously be employed in rotary molding machines for producing plastic articles.

U.S. Pat. No. 3,703,348

Inventor: Stewart Pivar

Issued: Nov. 21, 1972

Apparatus is provided for molding thermoplastic articles in hollow form in which a frame or stand is provided which has two stable positions. These are selectively employed to hold a mold in inclined or horizontal attitudes, the mold being provided with an open end on which is placed a cover with an opening therein so that access to the interior of the mold is possible. Thermoplastic material is placed in the mold which is heated so that the material fuses to the mold and the article is thereby formed. Access to the interior of the mold permits improved control over the formation of the objects being molded and permits various possibilities such as forming articles with stripes therein or with mechanical parts incorporated into the object.

SUMMARY OF THE PRESENT INVENTION

The present invention relates generally to ovens and, more specifically, to a rotational molding oven able to be operated in a bi-axial rotational mode, a rock and roll mode or both, wherein the mold is both heated and cooled evenly by the oven with resin evenly distributed throughout to manufacture a primarily hollow or a partial shell object.

A primary object of the present invention is to provide a rotational molding oven that will overcome the shortcomings of prior art devices.

Another object of the present invention is to provide a rotational molding oven which is able to operate in either bi-axial or rock and roll modes or both to optimize the quality control of a molded product.

A further object of the present invention is to provide a rotational molding oven which is able to both heat and cool the molds positioned within a cavity thereof wherein all cycles begin from the same start-up state with the same preheat cycle thus providing consistent mechanical and thermal cycles which reduce the part-to-part variance and number of rejects produced.

A yet further object of the present invention is to provide a rotational molding oven wherein the sequence and speed of rotation of the mold can be controlled to suit the particular object being formed.

A still further object of the present invention is to provide a rotational molding oven including drive assemblies for both a primary and secondary axis of rotation located completely outside the cavity to facilitate maintenance on the oven and minimize exposure of the drive assemblies to extreme temperature and humidity environments such as that found within the cavity of the oven, wherein drive trains connect the drive assemblies with their respective shafts, the drive trains being entirely contained outside of the heated cavity.

An even further object of the present invention is to provide a rotational molding oven wherein the burner combustion chamber, which may be located external and below or to the rear of the oven, is capable of operating on a variety of fuels and provides hot gasses to a plenum located below the cavity.

A still further object of the present invention is to provide a rotational molding oven including an exhaust stack having a volume control damper for controlling cavity pressure and a re-circulating fan connected to the cavity and discharging through the combustion chamber to increase gas recirculation velocity, to optimize combustion and to reduce tramp air infiltration into the cavity.

A yet further object of the present invention is to provide a rotational molding oven having a cavity generally comprised of an insulated spool operating within an insulated stationary shell, wherein the sides of the spool act as the side walls of the cavity and which spool is itself rotated to provide the secondary axis of rotation.

A still further object of the present invention is to provide a rotational molding oven wherein the drive train for the primary axis drives a sprocket acting at the center of the secondary axis, rotational motion of the sprocket is transferred by a chain drive to a second sprocket attached to a drive shaft acting within a drive tube located at the perimeter of the spool. The drive shaft is connected to the primary drive shaft through a set of bevel gears housed in the drive tube and which drive tube is insulated and ventilated to maintain ambient room conditions within the drive tube at all times. In one configuration the drive tube is located at the periphery of the spool and contains one spindle for one mold. In another configuration the drive tube is located at the spool center aligned with the axis of the spool and containing two opposing spindles to drive two molds simultaneously.

A yet further object of the present invention is to provide a rotational molding oven wherein the drive means for the secondary axis drives a chain through an idler sprocket to the perimeter of spool where the chain engages drive pins and effects control over the rotational motion of the spool and wherein the drive can be stopped, started and reversed at will to alter the nature of the molding process.

An even further object of the present invention is to provide a rotational molding oven wherein a drive means for a cooling fan is located on top of the oven driving a sprocket acting at the center of the secondary axis, which rotational motion is transferred to a second sprocket connected by a chain to a sprocket attached to a drive shaft which acts through a drive tube located at the perimeter of the spool. The drive shaft is connected to a cooling fan located within the insulated drive tube and which fan maintains the conditions within the drive tube close to the ambient room temperatures. In another configuration the fan and drive shaft are located at the spool center aligned with the axis of the spool.

A still further object of the present invention is to provide a rotational molding oven supporting a mold at the center and rotating the mold in center-less fashion about two axes of rotation at the center of the oven wherein the oven will be least possible size to house the rotating mold.

Another object of the present invention is to provide a rotational molding oven that is simple and easy to package, transport, install and use.

A still further object of the present invention is to provide a rotational molding oven that is economical in cost to manufacture.

Additional objects of the present invention will appear as the description proceeds.

A rotational molding oven for forming an object from a mold filled with resin is disclosed by the present invention. The rotational molding oven includes a cavity for retaining the mold, a burner for heating the cavity and melting the resin, fans for cooling the cavity and hardening the resin, a device for rotating the mold about two axes, a drive means for each direction of rotation which is mounted on the exterior of the oven wherein the secondary axis of rotation is driven in either direction and the primary axis of rotation is directly driven, and wherein the secondary rotation can be reliably and accurately started, stopped and reversed as required to optimize the resin distribution within the mold during molding.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
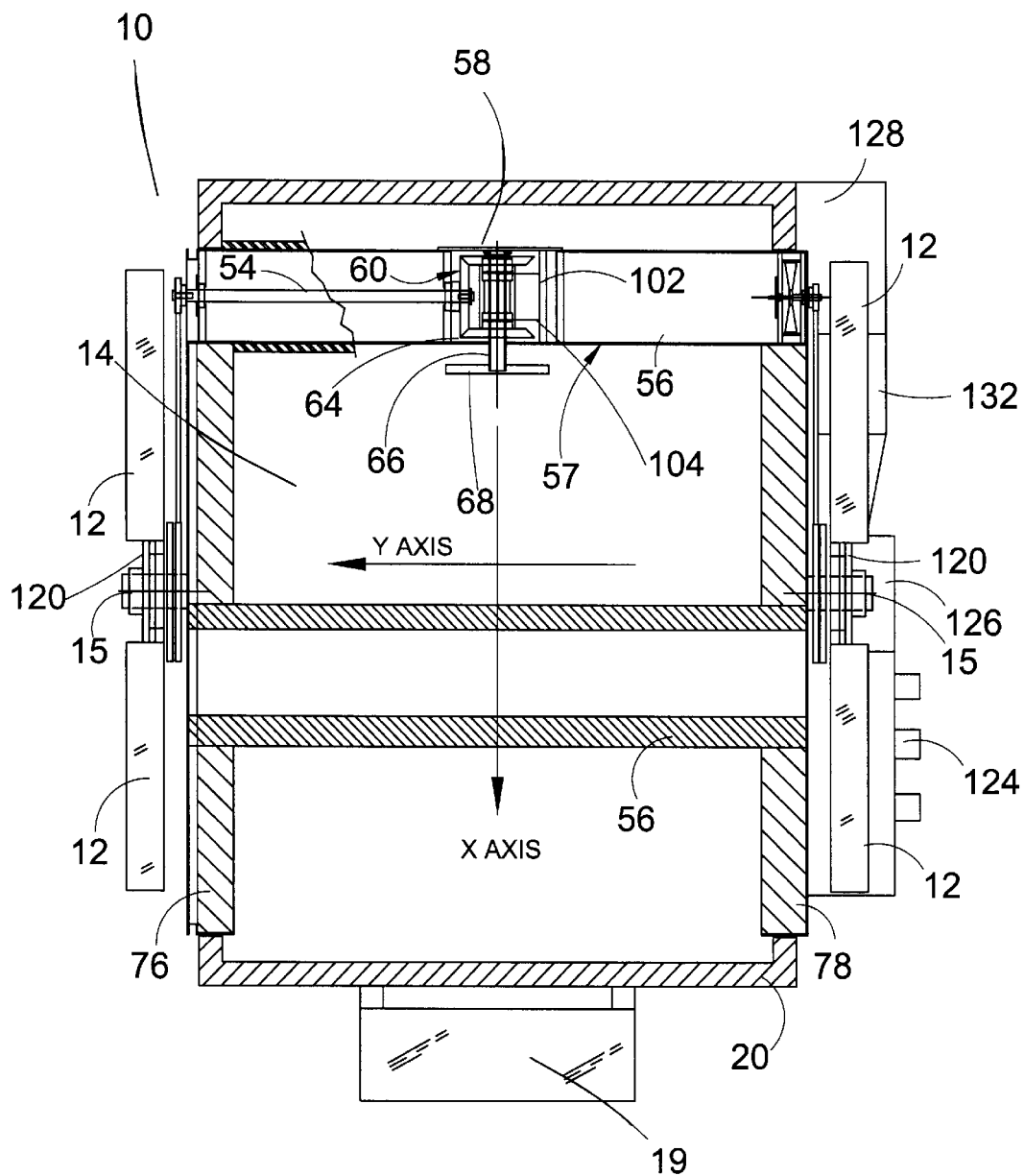
FIG. 1 is a top cross-sectional view of the rotational molding oven of the present invention.

Turning now descriptively to the drawings, in which similar reference characters denote similar elements throughout the several views, the Figures illustrate the rotational molding oven of the present invention. With regard to the reference numerals used, the following numbering is used throughout the various drawing figures.

10 rotational molding oven of the present invention
12 rigid frame
14 single mold, dual function process cavity
15 flanged bearings
16 combustion chamber
18 distribution duct
19 control panel
20 door
21 hinge
22 exhaust stack
24 volume control damper
26 short duct
28 cooling exhaust fan
30 control damper
32 cooling injection fan
34 high pressure water pump -continued 36 spray nozzles
38 water discharge pipe
40 first drive motor
42 second drive motor
43 idler sprocket
44 perimeter drive chain
45 spool drive sprocket
46 outer periphery (circumference of the cavity)
48 first driven chain
50 sprocket
52 second drive chain
54 drive shaft
56 drive tube
57 drive tube assembly
58 gear box
60 bevel gear
64 right-angle drive means
66 spindle drive shaft
68 bolt up plate
70 mold
72 ventilation fan
74 drive spool
76 first flanged disk
78 second flanged disk
80 transverse structural members
82 short hollow shaft
84 recess
86 roller bearing
88 top of the oven
89 fan drive chain
90 fan drive motor
91 fan motor drive chain
92 first right-angle drive means
94 first bolt up plate
96 second bolt up plate
98 second right-angle drive means
99 long spindle drive shaft
100 electric brake
101 speed reducer
102 drive support brace
104 removable frame
106 spindle shaft bearings
108 bearings
110 radial bearing
112 sprocket
114 shaft
116 bearings
118 outboard drive sprocket
120 main bearings
122 fan shaft
124 gas burners
126 combustion air fan
128 recirculation fan
132 short discharge duct
134 supply piping
136 relocatable tube
138 anchor block
140 drive tube connector
142 anchor block
144 drive tube connector
146 drive shaft stub
148 drive shaft coupling
150 key
152 sprocket
153 sprocket shaft
154 retention nut
156 fan sprocket
158 perimeter seal
160 perimeter drive channel
162 drive pin dowels
164 rear panel assembly
166 base assembly
168 top assembly
170 front panel assembly
172 main bearing plate

DETAILED DESCRIPTION OF THE PREFERRED EMBODIMENT

Turning now descriptively to the drawings, in which similar reference characters denote similar elements throughout the several views, FIGS. 1 through 19 illustrate the rotational molding oven of the present invention indicated generally by the numeral 10.

In the preferred embodiment of the rotational molding oven 10 of the present invention, a system of multiple, single-cavity ovens, the dependence of one mold on the requirements of any other is eliminated. This frees each mold to be rotated about both axes and heated and cooled in a fashion best suited to the particular parts to be formed. The rotational molding oven 10 is a single cavity, combined cycle oven which overcomes the primary obstacles of past designs of both rock and roll and bi-axial systems and optimizes quality control of the molded product.

Figure 8:
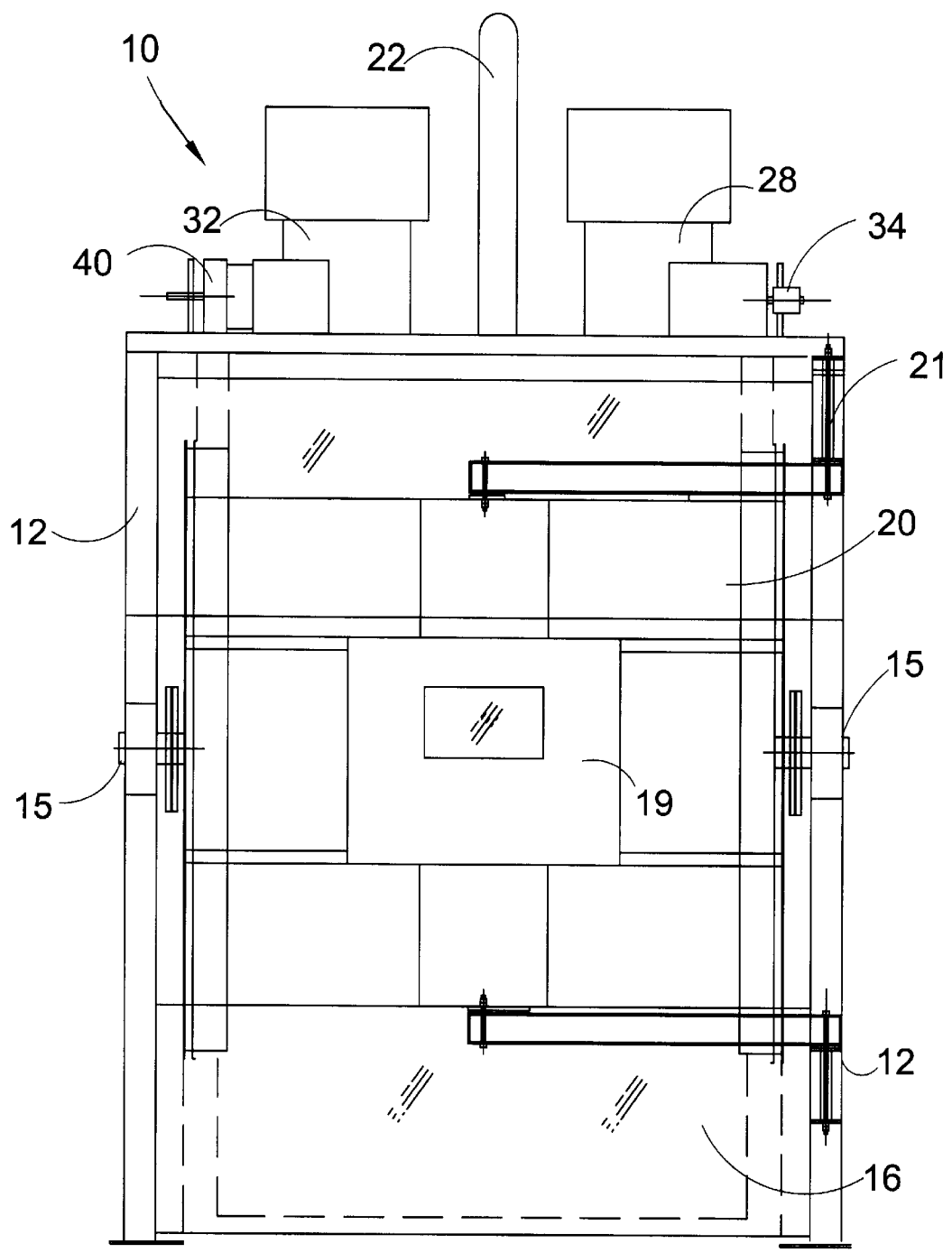
FIG. 8 is a front view of the rotational molding oven of the present invention.
Figure 18:
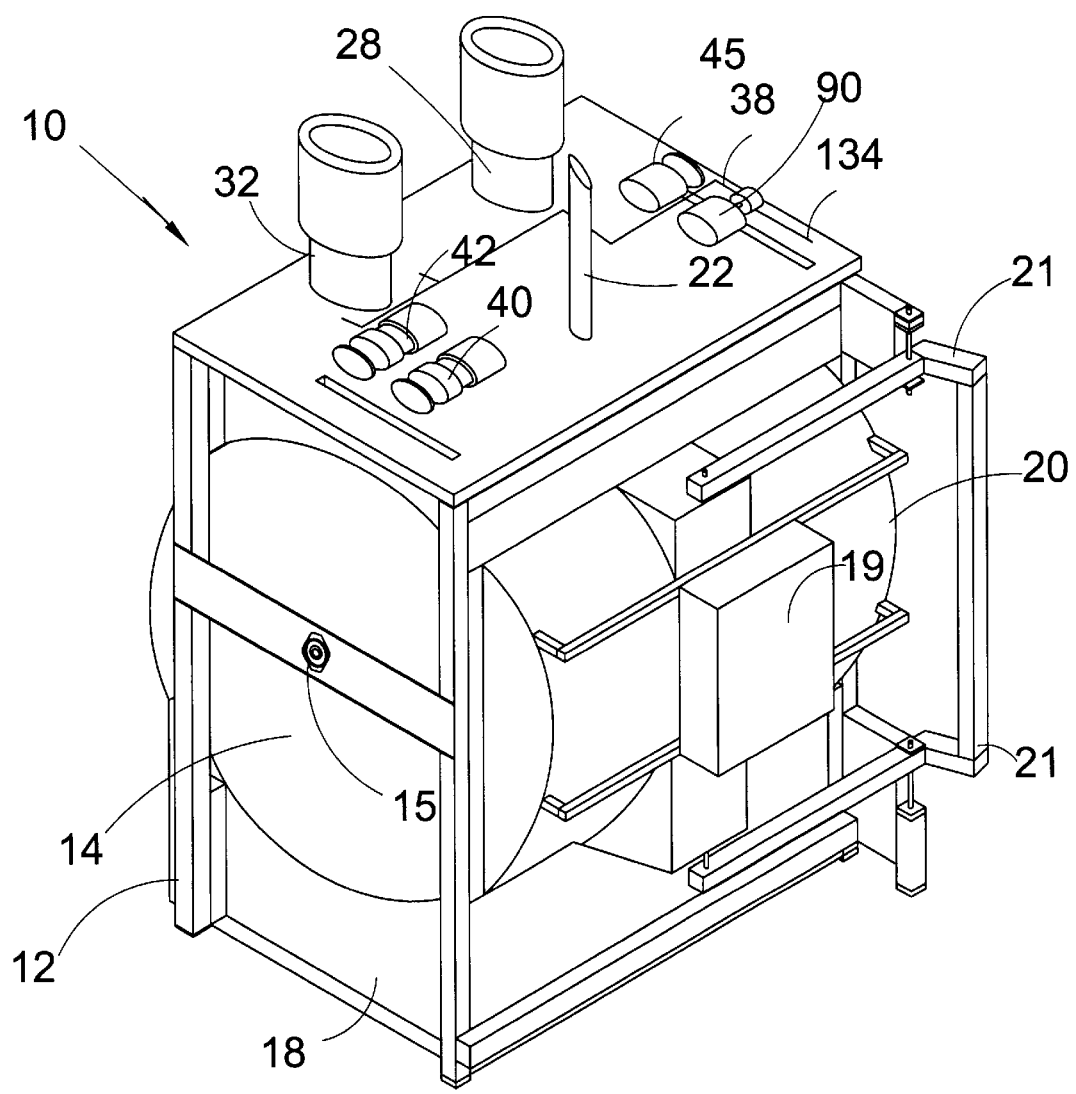
FIG. 18 is a top perspective view of the rotational molding oven of the present invention.
Figure 19:
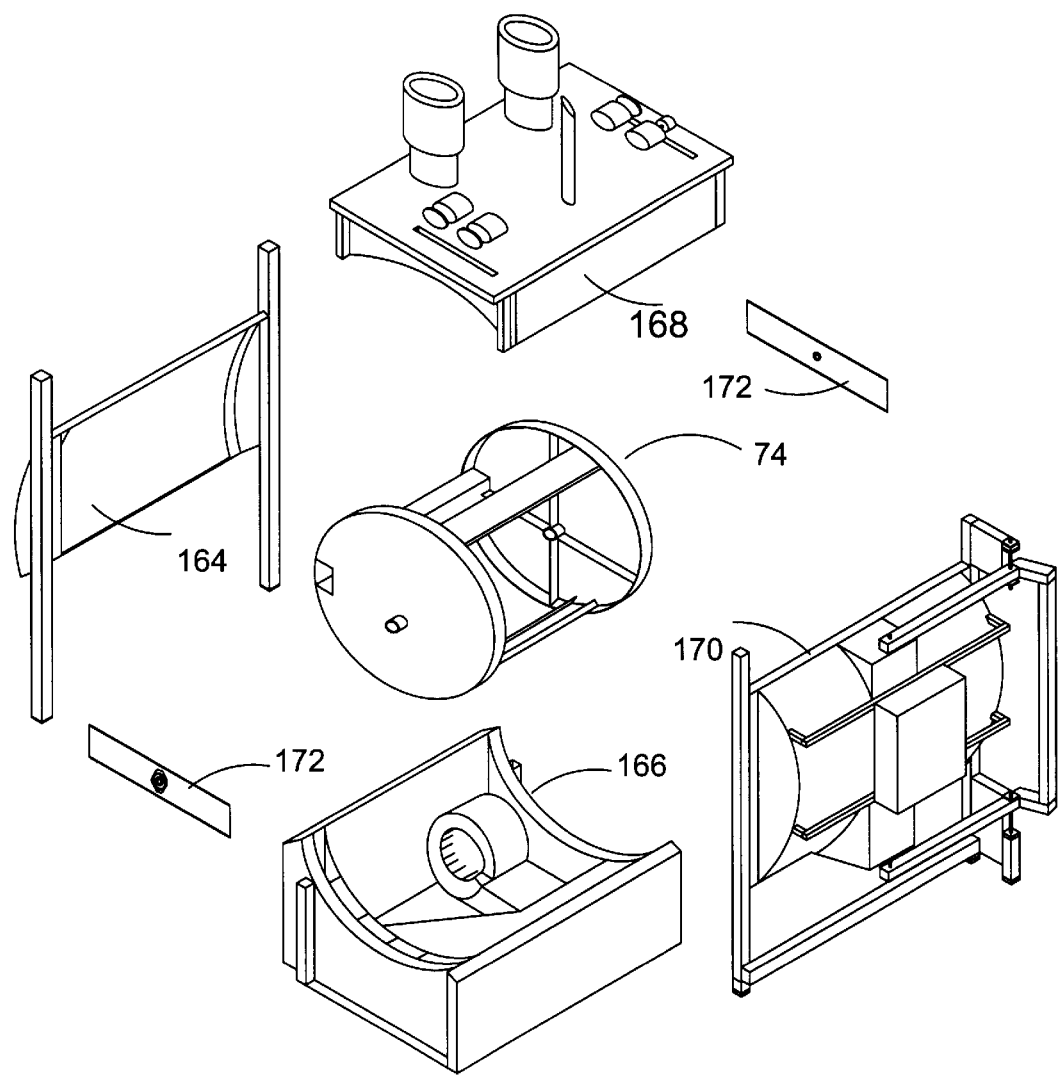
FIG. 19 is a top perspective view of the rotational molding oven of the present invention in exploded view showing subassemblies

The rotational molding oven 10 is shown in FIG. 18 in perspective view and in FIG. 19 in exploded perspective view. FIG. 1 illustrates a top cross-sectional view in plan at centerline. The rotational molding oven 10 is built around a rigid frame 12 and includes a single mold (not shown), dual function process cavity 14. A rigid spool 74, the ends of which comprise a part of the cavity 14, is located within the rigid frame 12 and is pivotally secured to the rigid frame 12 by flanged bearings 15. A front elevation view is shown in FIG. 8. A base section is positioned underneath the cavity 14 and contains a combustion chamber 16 with combustion air fan 126, recirculation fan 128 and distribution duct 18. The combustion chamber 16 performs multi-stage burning. This provides extra heat input for the pre-heat cycle and allows for close temperature control throughout the heating cycle.

The process cavity 14, located within the rigid frame 12 and above the plenum 18, is a cylinder set on its side, with the door 20 positioned on a front side thereof. The door 20 is pivotally connected to the frame 12 by dual pivot hinges 21 and provides selective access to the inside of the cavity 14. The door 20 opens fully and pivots out of the way for greater access. The door 20 conforms to the shape of the cavity 14 thereby increasing cavity volume while minimizing oven size and floor space requirements and reducing heat loss. Located on a side of the door 20 outside the cavity 14 is a control panel 19. The control panel 19 is used by an operator to control operation of the rotational molding oven 10.

A drive spool 74 forms two sides of cavity 14. The drive spool 74 includes a first flanged disk 76 and a second flanged disk 78. The first and second flanged disks 76 and 78 are positioned on opposite sides of the cavity 14. Extending between the first and second flanged disks 76 and 78 are transverse structural members 80. Within the cavity 14 and extending transversely therethrough and fixed to spool 74 is a drive tube assembly 57 as can be seen from FIG. 1 and FIG. 4. A drive shaft 54 and a gear box 58, including a spindle drive shaft 66 are positioned within the drive tube assembly 57. Positioned in a central position on both the first and second flanged disks 76 and 78 is a short hollow shaft 82 which extends through flanged bearings 15 to rotatably connect the drive spool 74 to the frame 12. Thus, when the flanged disks 76 and 78 are caused to rotate, the drive tube 56 is caused to rotate therewith.

Figure 5:
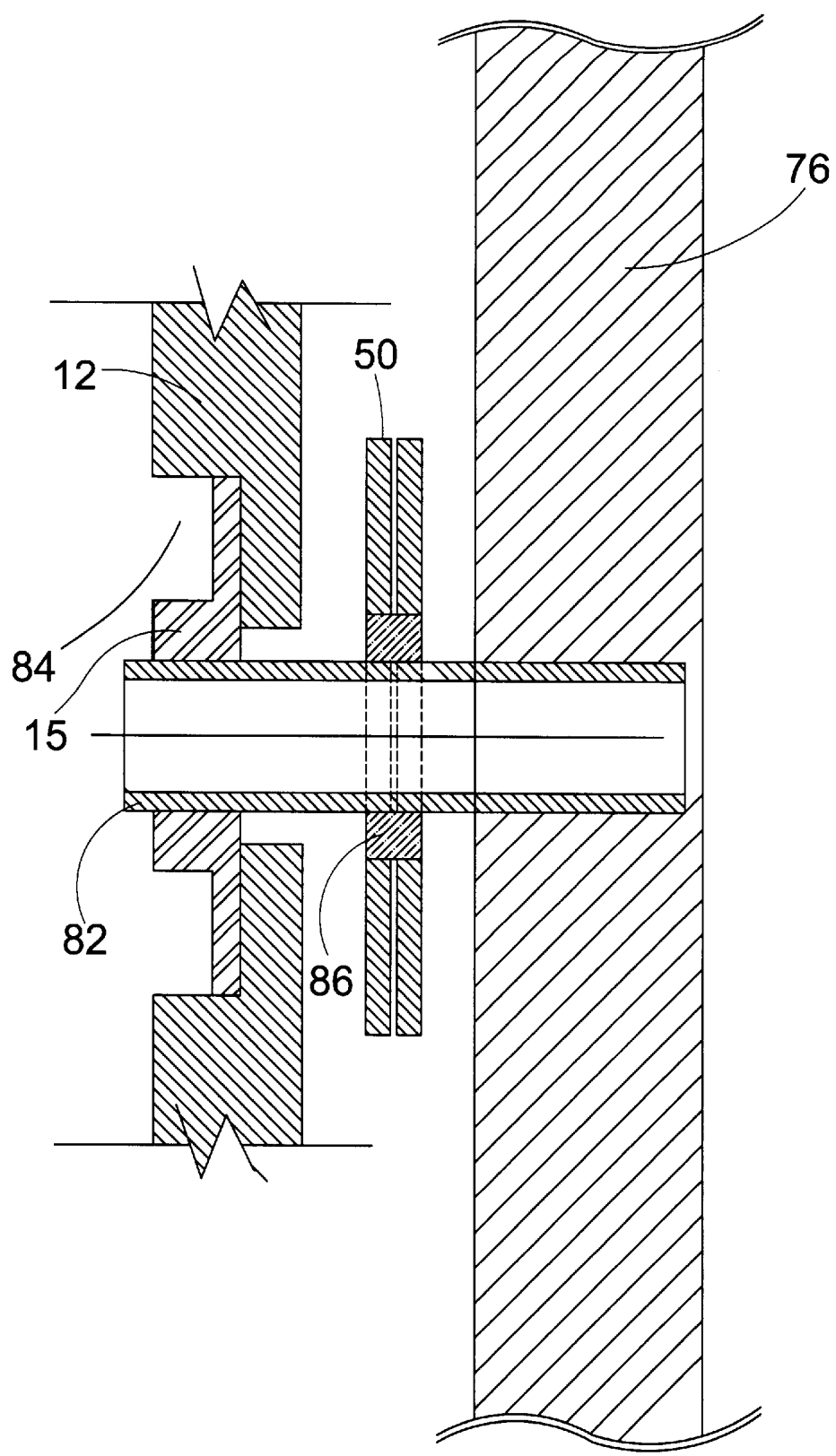
FIG. 5 is a side view in partial cross section of the main bearing assembly of the rotational molding oven of the present invention.

An enlarged view of the main bearing assembly connection between the frame 12 and the drive spool 74 is shown in FIG. 5. As can be seen from this figure, a hollow shaft 82 extends through a recess 84 in frame 12 and through flanged bearing 15 on each side of the oven. The short hollow shafts 82 are engaged and rotatably held by the flanged bearings 15 which are secured to frame 12 and act to retain the spool 74 through flanged disks 76 and 78 secured thereto.

Figure 3:
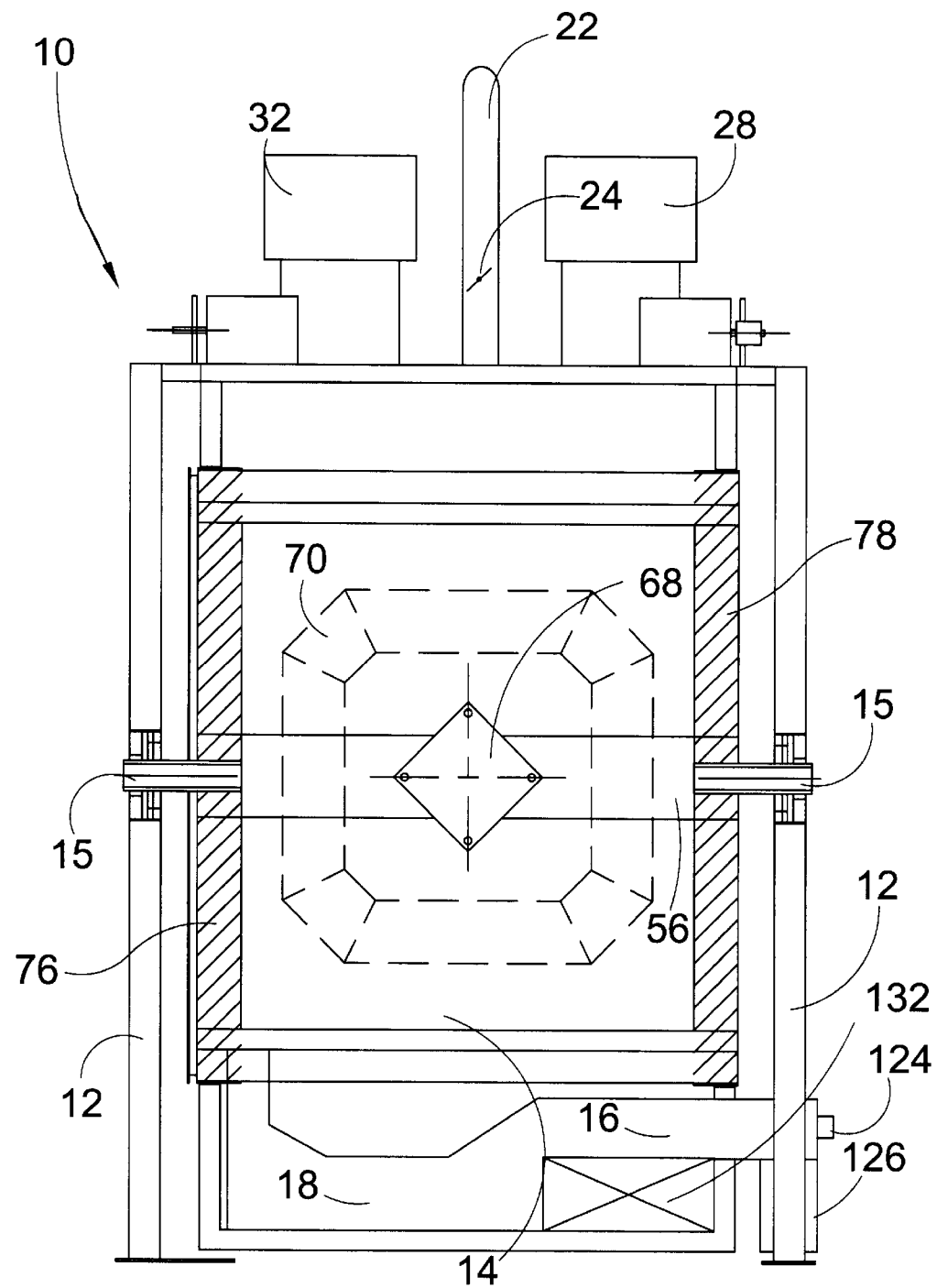
FIG. 3 is a front view in partial cross-section of the rotational molding oven of the present invention.
Figure 4:
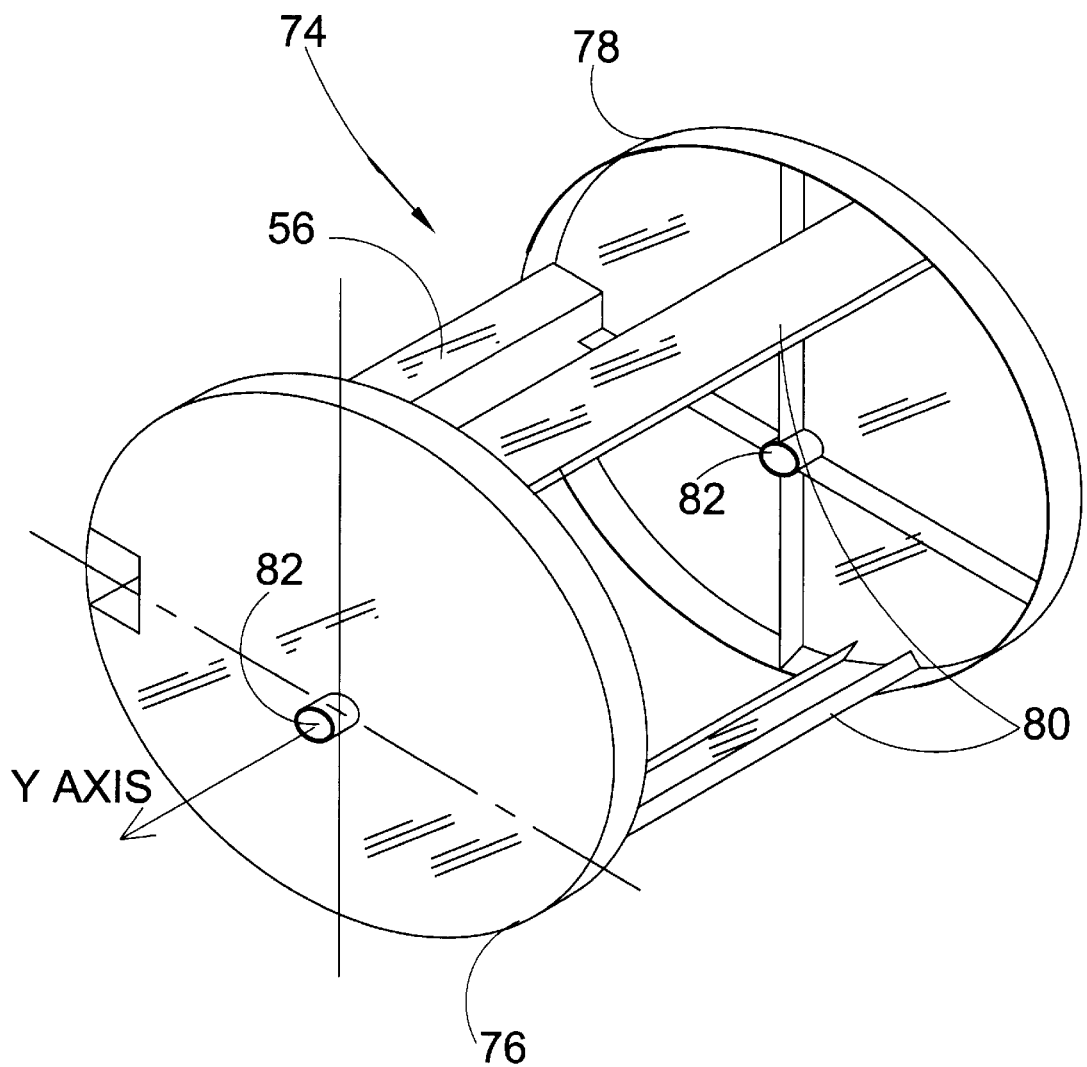
FIG. 4 is an enlarged top perspective view of the drive spool of the cavity of the rotational molding oven of the present invention.

As is seen from FIG. 3, the combustion chamber 16 connects to the cavity 14 through a plenum 18 which is located near floor level and below the process cavity 14. The combustion chamber 16 preferably burns hydrocarbon fuel. However, the combustion chamber 16 is capable of operating on a variety of fuels for providing hot gasses to a plenum located below the cavity.

As can be seen in FIGS. 2, 3, 6 and 7, an exhaust stack 22 with a volume control damper 24 is positioned on top of the frame 12, extending above the cavity 14. Also on a top of the frame 12, above the cavity 14 and connected to an inside of the cavity 14 by a short duct 26, is cooling exhaust fan 28 and cooling air injection fan 32. A damper 30 seals off the fans 28 and 32 during the heating cycle and opens to provide high volume air intake to and discharge from the cavity 14 during the cooling cycle.

A high pressure water pump 34 is located on top of the oven 10 and is connected between a water supply by supply piping 134 and to a plurality of spray nozzles 36 by discharge piping 38. The pump 36 injects a spray of water to the discharge of fan 32. The pump 34 and spray nozzles 36 supply water in the form of a cooling mist to the cavity 14 during the cooling cycle.

Figure 6:
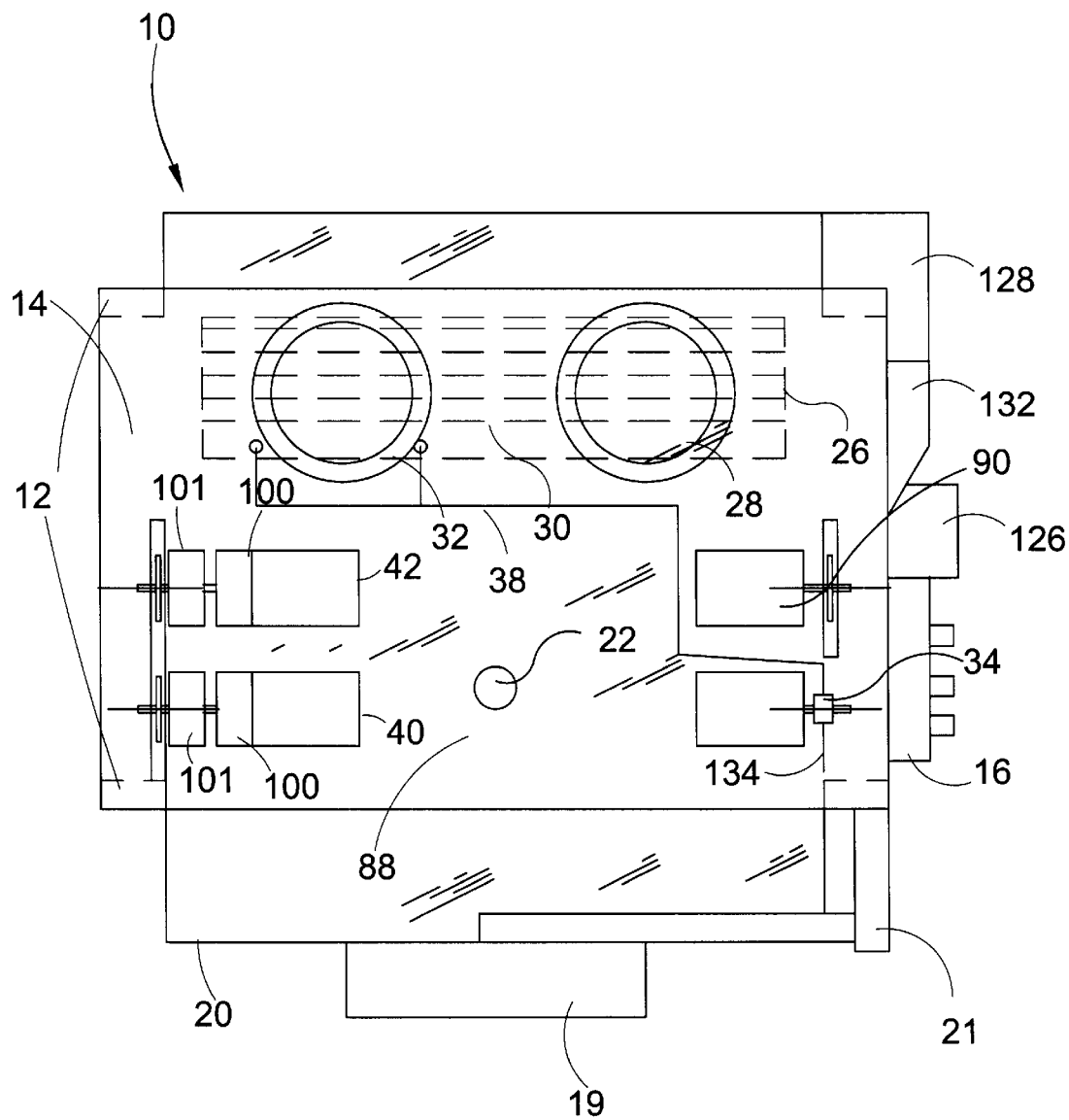
FIG. 6 is a top view of the rotational molding oven of the present invention.

A top view of the rotational molding oven 10 is shown in FIG. 6. On one side of the top of the oven 88, is a first drive motor 40 and a second drive motor 42. The first and second drive motors 40 and 42 are provided for rotating the drive spool 74 and the drive shaft 54. On the other side of the top is a third drive motor 90 to rotate the drive shaft cooling fan 72 and a drive and pump 34 to supply cooling water. The door 20 is shown extending from a side of the rotational molding oven 10. The hinges 21 are shown connecting the door to the frame 12 and the control panel 19 extends from the side of the door 20 opposite the cavity 14.

Figure 7:
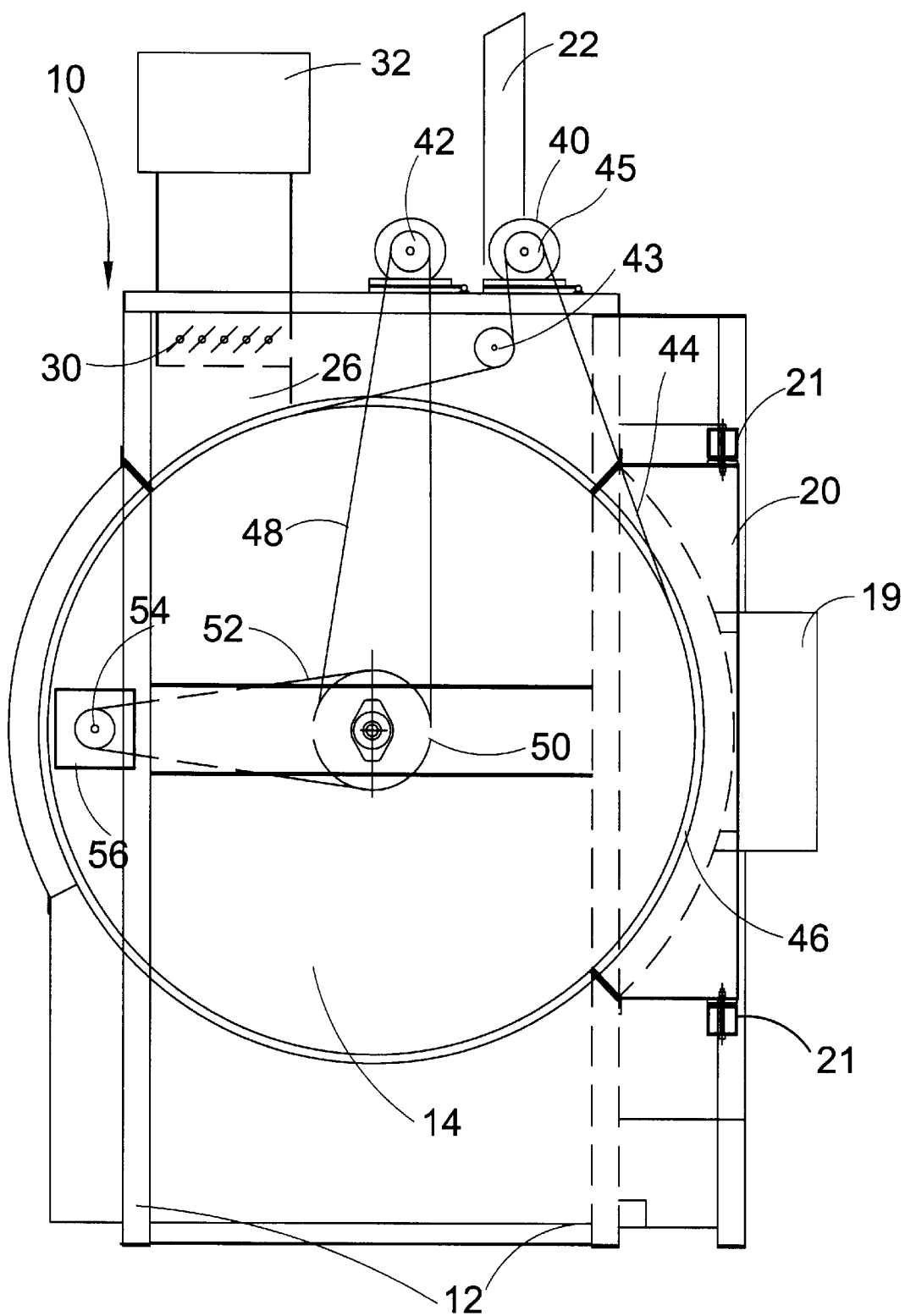
FIG. 7 is a side sectional view of the rotational molding oven of the present invention.

Rotational motion of a mold 70 is provided by the first and second drive motors 40 and 42, respectively, located on the top side 88 of the cavity 14 as can be clearly seen in FIG. 7. The first drive motor 40 is a spool drive which drives the drive spool 74 about its horizontal axis (y axis) through a chain 44 which wraps around the outer periphery 46 of the circumference of the flanged disk 76 of the spool drive 74 and over a spindle 43. The chain 44 is caused to traverse the periphery 46 of the circumference of the flanged disk 76 when the first drive motor 40 rotates. The spindle 43 is rotationally mounted to the top assembly 168 and is adjusted to hold a tension on the chain 44 to maintain positive motion tracking in both directions. By acting at the perimeter of the flanged disk 76, the drive chain 44 travel is long and can be easily controlled to stop, pause, reverse direction, and restart at any predetermined or process determined angle. The first drive motor 40 may be a variable speed motor and will therefore be able to minimize dwell time at undesirable angles. The first drive motor 40 may also be a reversible motor thereby permitting use of the cavity 14 as a rock and roll oven. An electric brake may be provided on motor 40 to ensure positive stopping for position control and for reversing the direction of rotation of spool 74.

The second drive motor 42 drives the mold 70 about an axis (x axis) substantially perpendicular to the axis of the cavity 14 through a multiple chain drive system. The second drive motor 42 is a spindle drive motor and connected thereto is a first drive chain 48. The first drive chain 48 drives a sprocket 50 which is rotationally mounted to short shaft 82 by bearing roller 86. Sprocket 50 is located at the axis of primary rotation (y axis). A second drive chain 52, driven by sprocket 50 and acting from this axis redirects the drive motion to the drive shaft 54 located at the perimeter of the drive spool 74 and the oven cavity 14. The drive tube 56 is clearly seen in FIG. 1. The drive tube 56 is a straight hollow insulated tube which transverses the drive spool 74 near the perimeter. The drive tube 56 contains a gear box 58 at it's center. The drive shaft 54 is connected to the gear box 58, rotating gears within the gear box 58 when the drive shaft 54 is rotated.

Figure 10:
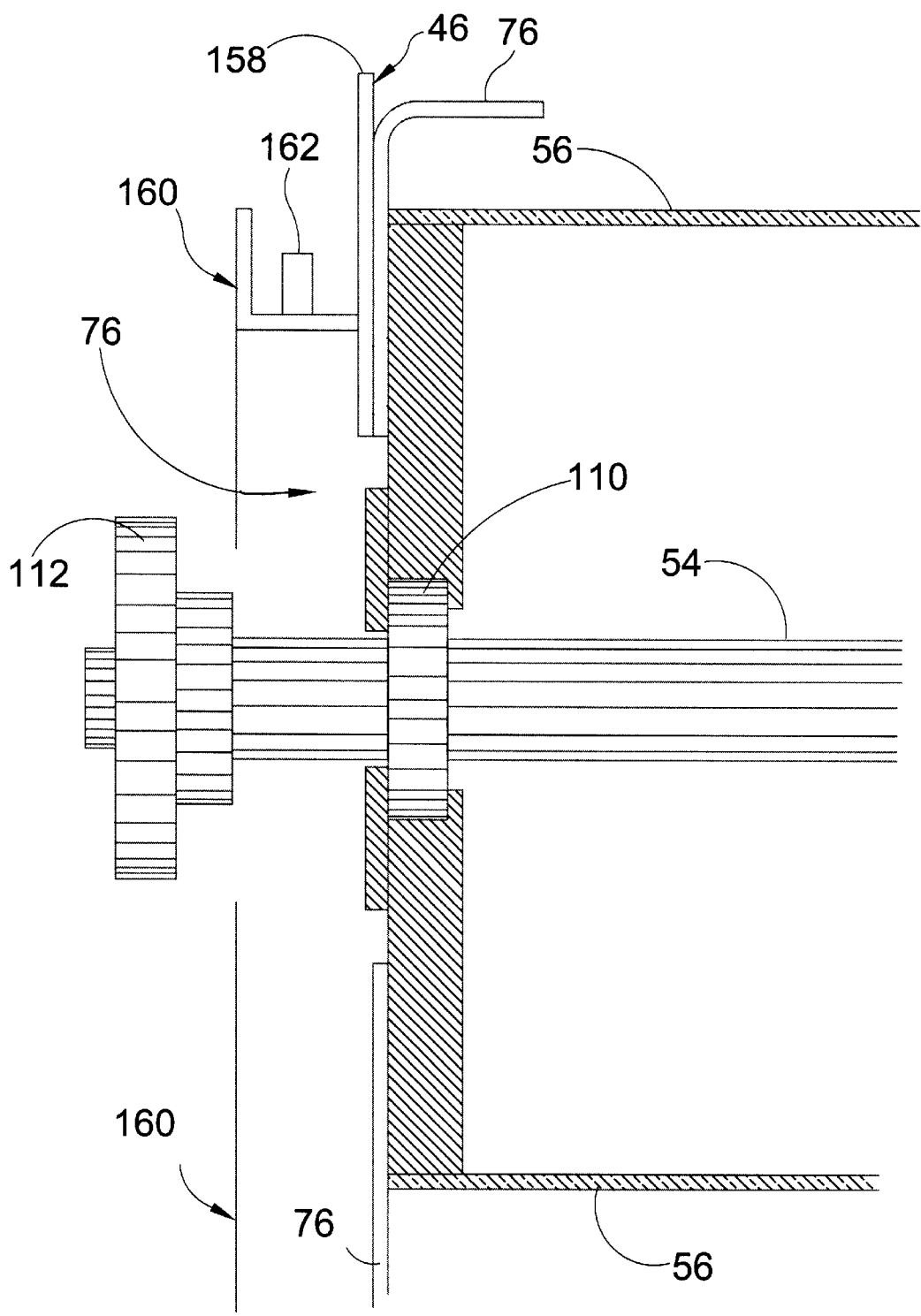
FIG. 10 is an exploded view of the primary drive mount within the drive tube of the rotational molding oven of the present invention.
Figure 11:
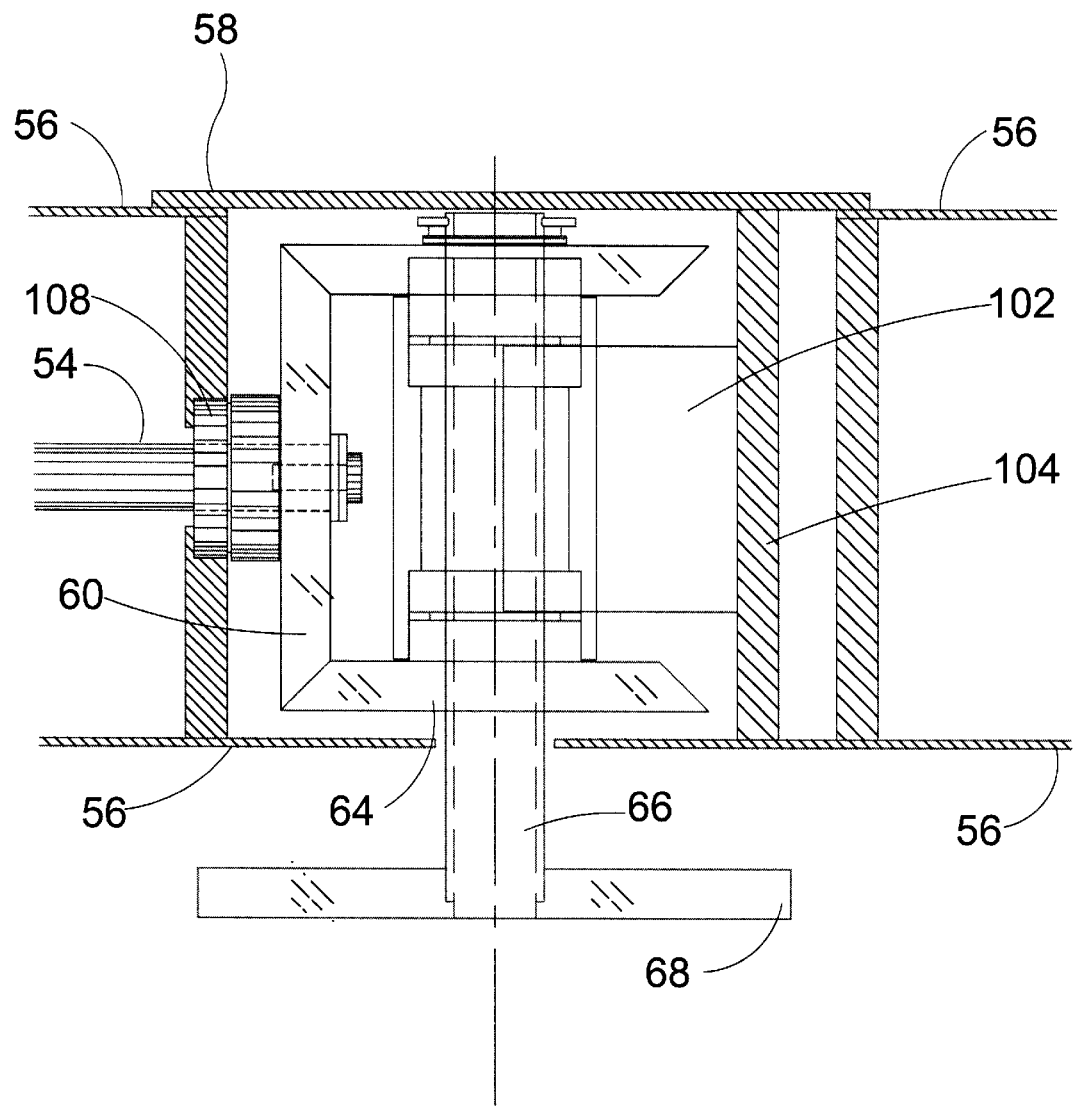
FIG. 11 is an exploded view of the rotating plate for retaining the mold within the drive tube of the rotational molding oven of the present invention.
Figure 12:
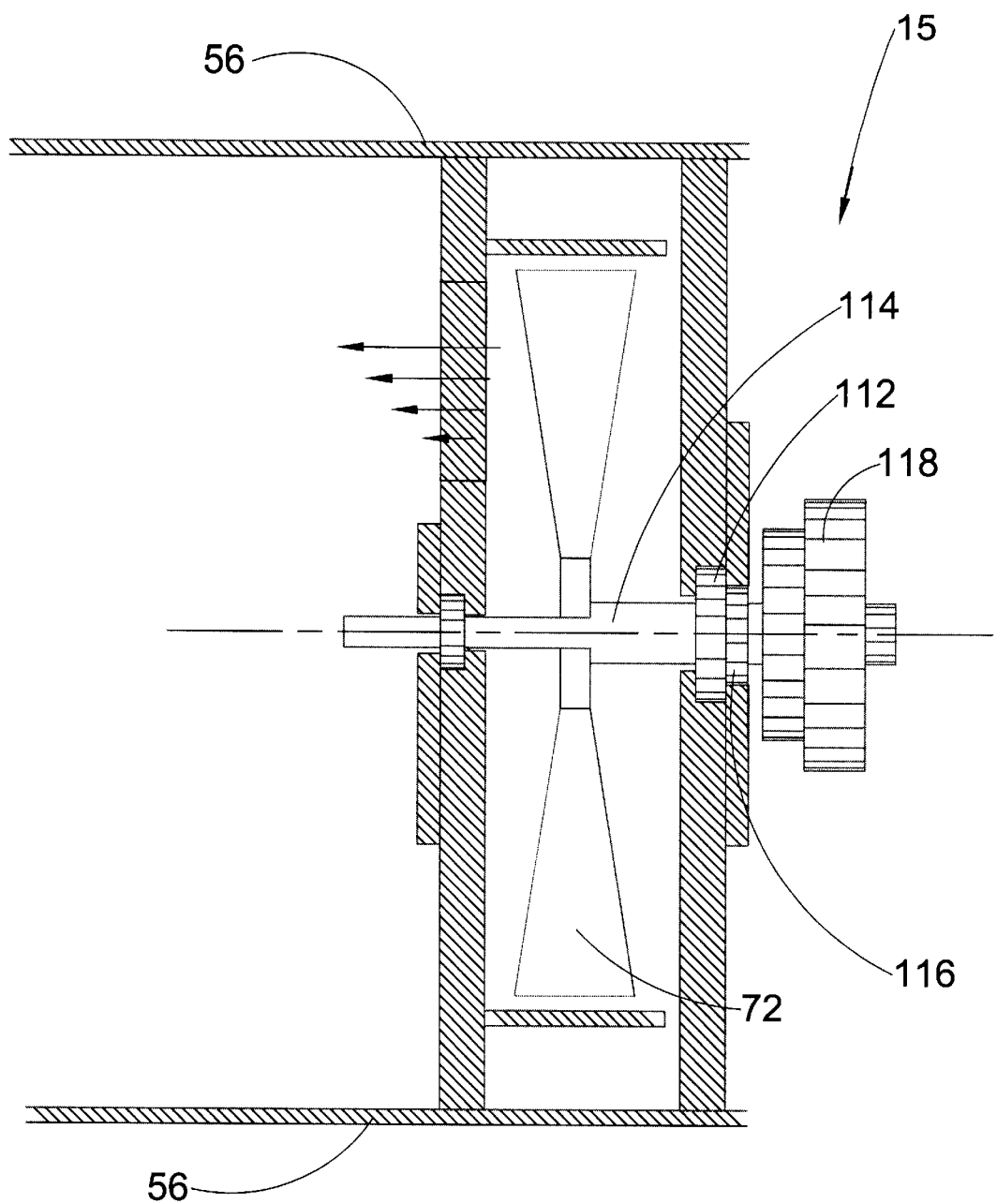
FIG. 12 is an exploded view of the cooling fan mount within the drive tube of the rotational molding oven of the present invention.
Figure 13:
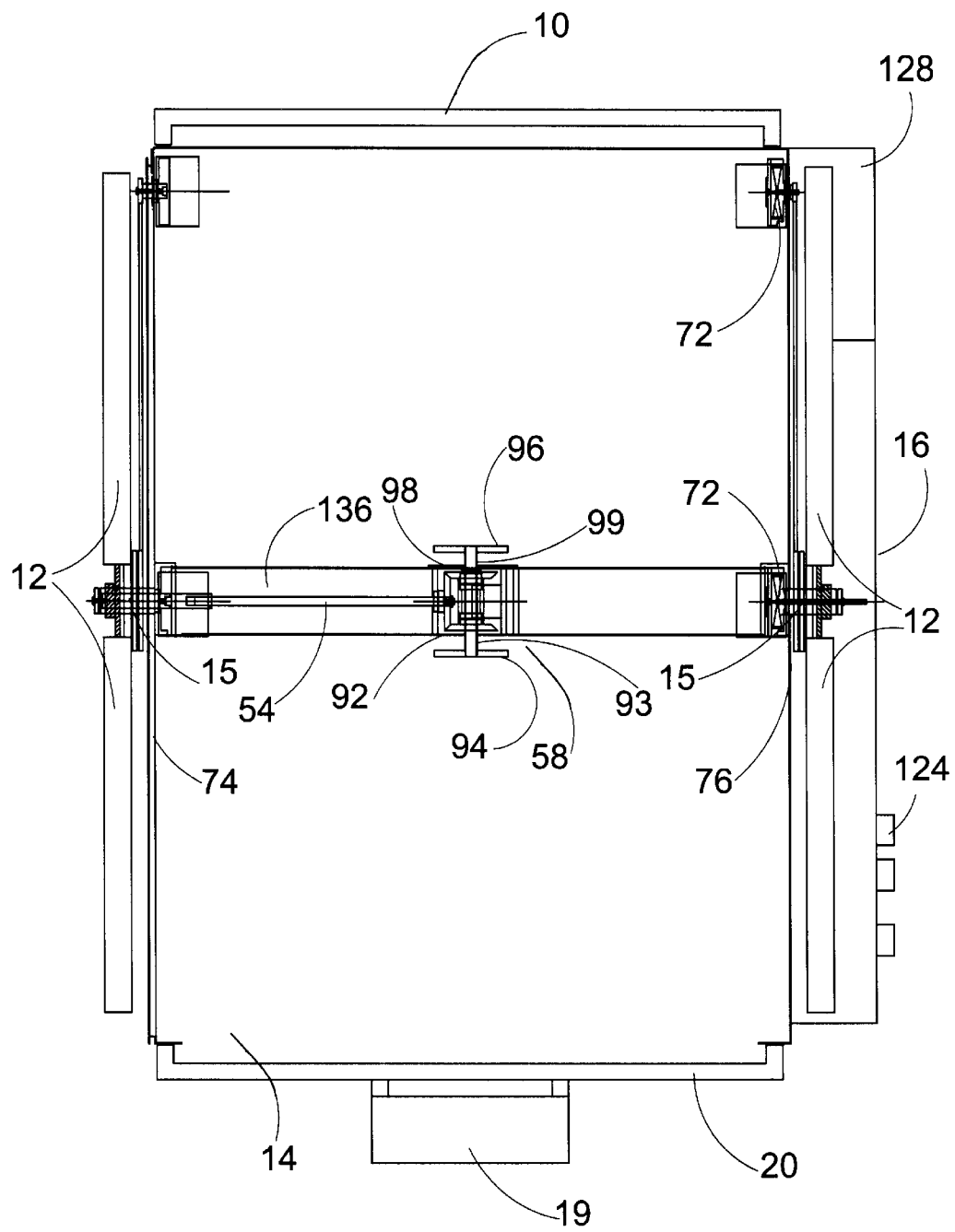
FIG. 13 is a sectional view of the rotational molding oven of the present invention showing the alternate drive tube installation.
Figure 14:
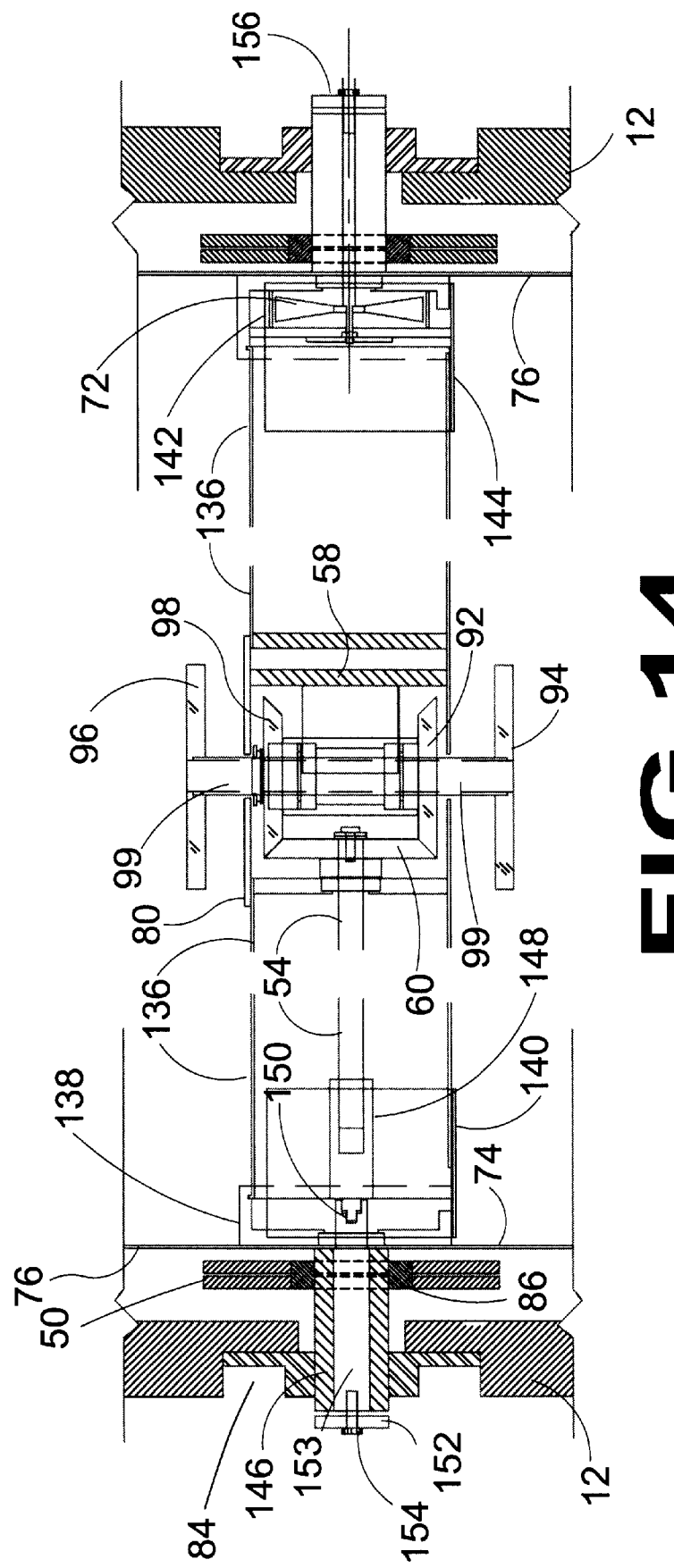
FIG. 14 is an exploded view of the relocatable drive tube assembly having a double ended spindle shaft of the rotational molding oven of the present invention.

An enlarged illustration of the drive tube 56 and gear box 58 is illustrated in FIGS. 9, 10, 11 and 12. The drive tube 56 and the gears are continuously air cooled by a ventilation fan 72 and preferably kept at a temperature below 2001 F. An enlarged view of the ventilation fan 72 is illustrated in FIG. 12. The ventilation fan 72 is located inside the drive tube 56 and is driven by a fan motor 90 mounted on top of the oven 10, through a chain drive system similar to the second drive motor 42 above, see FIG. 6.

The position of all motors on top 88 of the oven 10 keeps all motors out of the heated cavity 14 and all bearings, gears and lubricated surfaces at low temperatures. This also allows direct electrical connection of motors without the need for rotary contactors or slip rings generally required for locally mounted motors. All fans, burners and other maintained components are also located outside of the heated cavity in order to provide easy access, maintenance and long life service and to improve the efficiency of operation of the motors.

An enlarged view of the drive connection to the drive tube assembly 56 for rotating the spindle 66 is illustrated in FIG. 10. As can be seen from this figure, the sprocket 112 is attached to the end of shaft 54 and the shaft extends through the flanged disk 76. A radial bearing 110 holds the outboard end of the shaft 54 in position. The sprocket 112 is turned by the spool drive motor positioned on the top side of the oven 10. The sprocket 112 in turn rotates the drive shaft 54.

FIG. 11 illustrates the drive assembly 58. As can be seen from this figure, the drive assembly 58 includes the bevel gear 60 connected to the transverse drive shaft which shaft 54 extends within and parallel to the drive tube 56. The right-angle drive means 64 transfers the motion of the bevel gear 60 to the spindle drive shaft 66. The spindle drive shaft 66 includes the bolt up plate 68 on an end thereof for connection with the mold 70. The bolt up plate 68 holds the mold in position within the cavity 14. When the drive shaft 54 is rotated by the sprocket 112, the bevel gear 60 is also caused to rotate. The rotation of the bevel gear 60 rotates the right angle drive means 64. The right angle drive means 64 rotates the spindle drive shaft 66 and bolt up plate 68. As the mold 70 is connected to the bolt up plate 68, the mold 70 is caused to rotate therewith.

The combustion gasses are provided to the cavity 14 from the combustion burner 16 through the plenum 18. The combustion gasses received by the cavity 14 are caused to circulate in and around the mold 70 and are drawn down to the recirculation fan 128 and then back to the plenum 18 for reintroduction to the cavity 14. A small volume of gas will be drawn to the exhaust stack 22. Hot gas is agitated by the motion of the mold 70, by combustion and recirculation fan 128 and by the extended path from the plenum 18 to the combustion and recirculation fan 128 and to the exhaust stack 22. Gas is not permitted to by-pass the mold.

Figure 2:
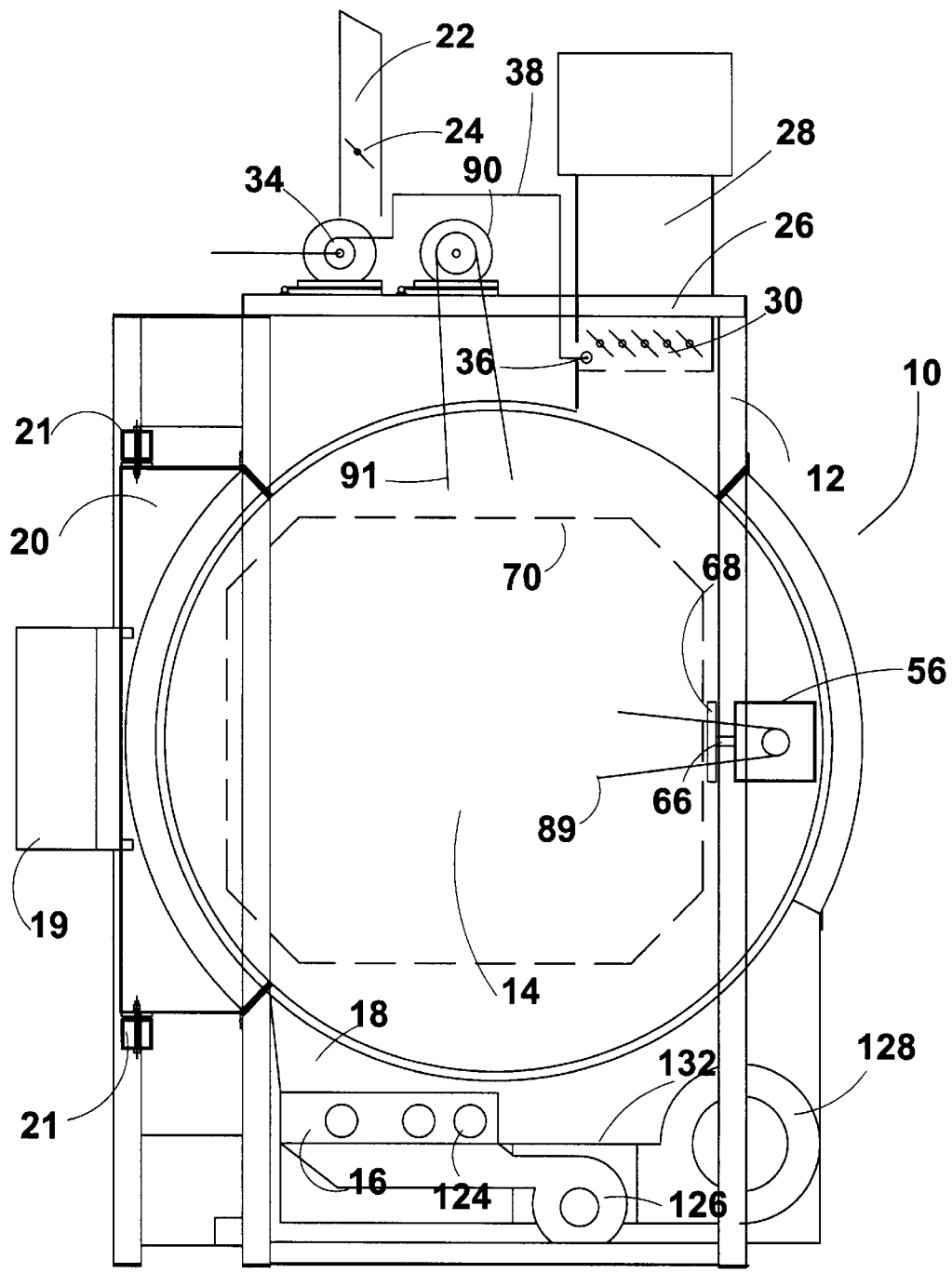
FIG. 2 is a side view in partial cross-section of the rotational molding oven of the present invention.

In the cooling cycle, cooling air is drawn in by cooling injection fan 32, FIG. 2, past water spray nozzles 36 and into the cavity 14 through half of damper 30. The Air flow is cooled by evaporation of part of the water spray and the balance of the water cools the mold directly. The cooling air flows around the mold 70 and is then drawn up to the cooling exhaust fan 28 through the other half of damper 30 and exhausted.

The process cavity 14 need only be large enough to receive the design mold.

An alternate embodiment is also disclosed herein with specific reference to FIGS. 13–17. In this embodiment, the drive tube 56 is replaced with a relocatable tube 136. The relocatable tube 136 is positioned at the center of the spool instead of at the periphery and connects to the drive spool 54 by way of an anchor block 138 and drive tube connector 140 at the shaft drive end and by anchor block 142 and another drive tube connector 144 at the cooling fan end. The drive shaft 54 is connected to a drive shaft stub 146 by a drive shaft coupling 148 and key 150 and is connected to a sprocket 152 by retention nut 154. The fan 72 is driven by a fan sprocket 156. The drive chains 44 and 48 to the double sprocket 50 are removed or disabled when the perimeter drive tube arrangement is not used. At this time the secondary chain connecting the motor 42 to the drive sprocket is installed and the center drive tube arrangement is in use. At this time the chain drives to the cooling fan are also removed or disabled and the secondary drive chain is connected to the fan sprocket 156.

Figure 15:
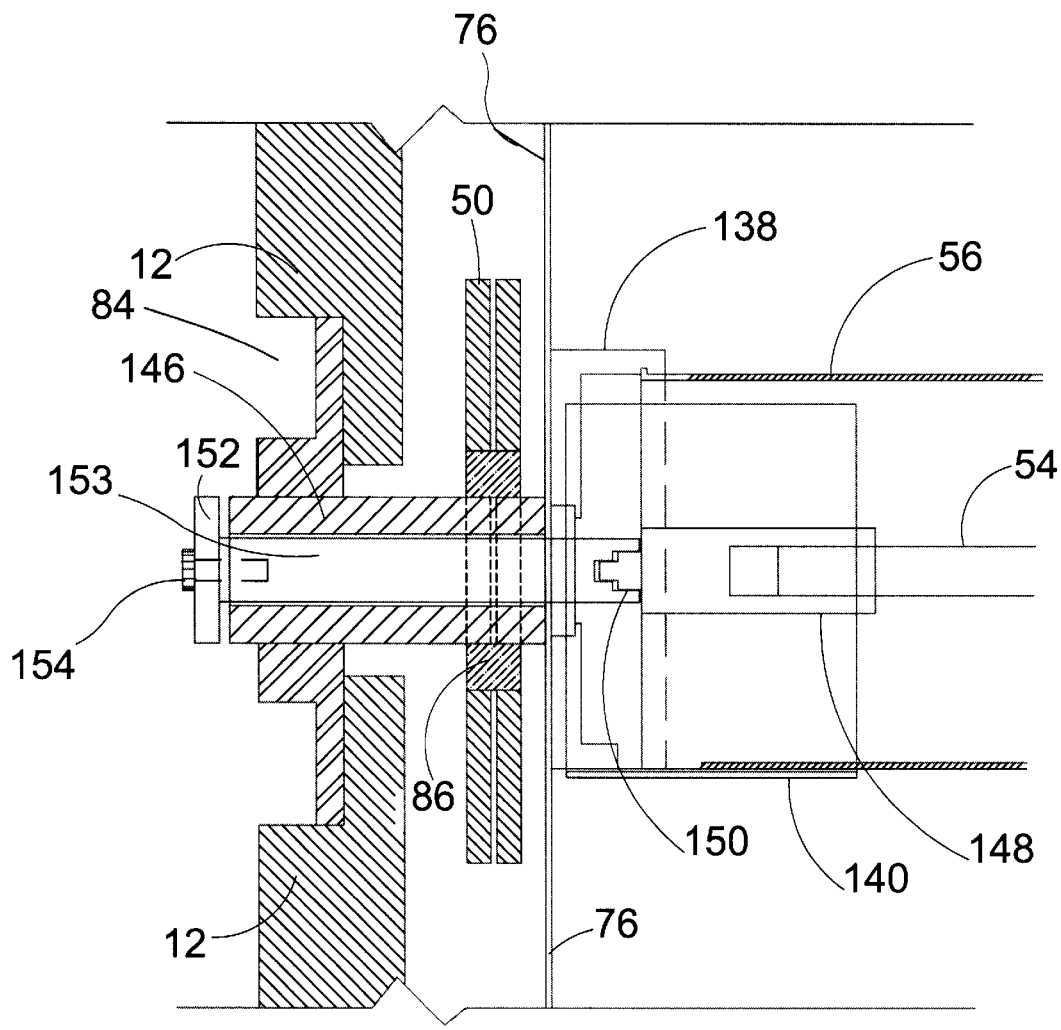
FIG. 15 is an exploded view of the primary drive mount within the relocatable drive tube having a double ended spindle shaft of the rotational molding oven of the present invention.

An enlarged view of the primary drive mount for rotating the drive shaft 54 is illustrated in FIG. 15. As can be seen from this figure, the sprocket 152 is fixed to a shaft stub 146 which extends through the spool drive flanged bearing 15 located within the recess 84 of frame 12 and is connected to the drive shaft 54. The sprocket 152 is turned by the spool drive motor 42 positioned on the top side of the oven 10. The sprocket 152 in turn rotates the drive shaft 54.

Figure 16:
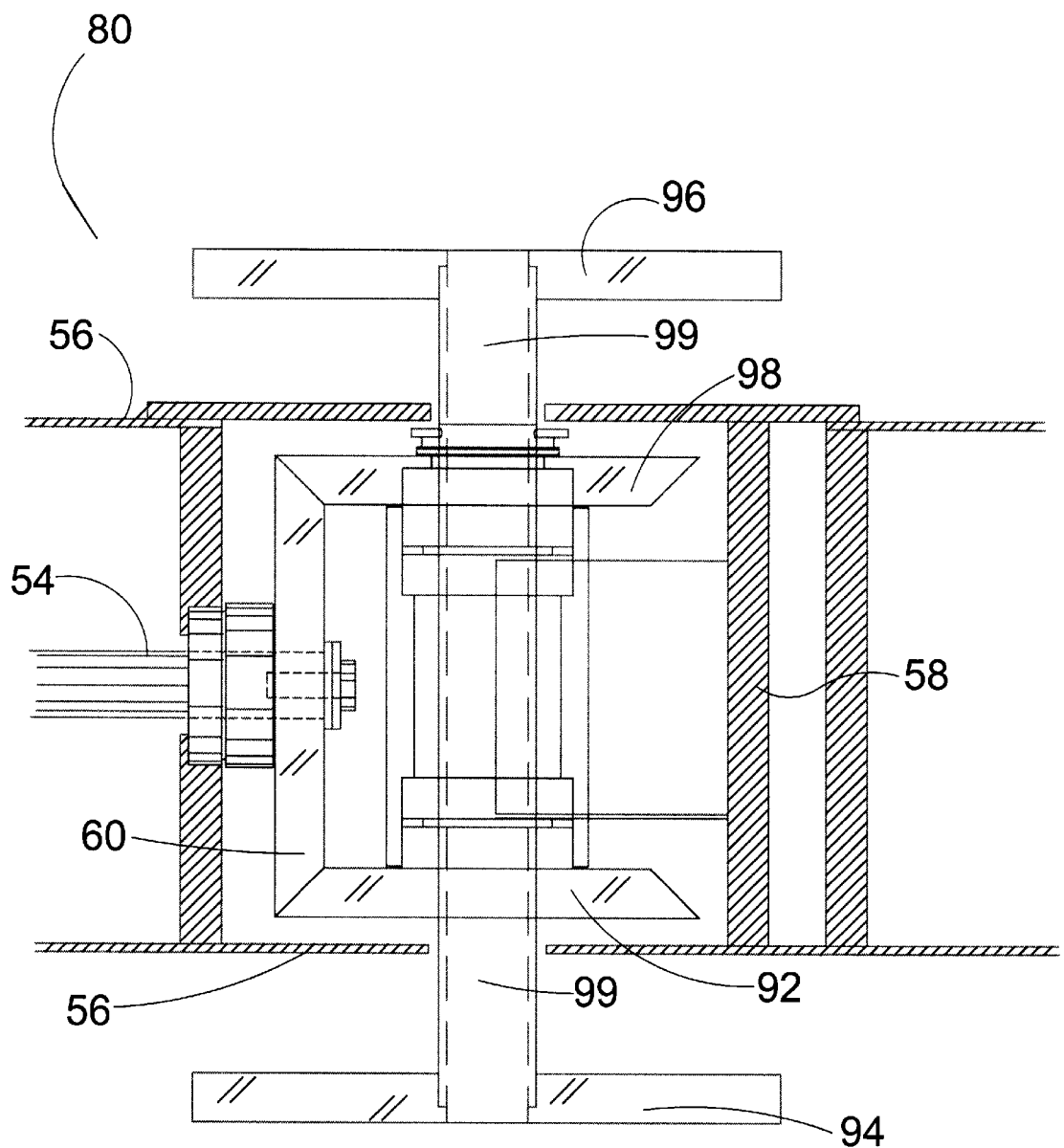
FIG. 16 is an exploded view of the rotating plate for retaining the mold within the relocatable drive tube having a double ended spindle shaft of the rotational molding oven of the present invention.
Figure 17:
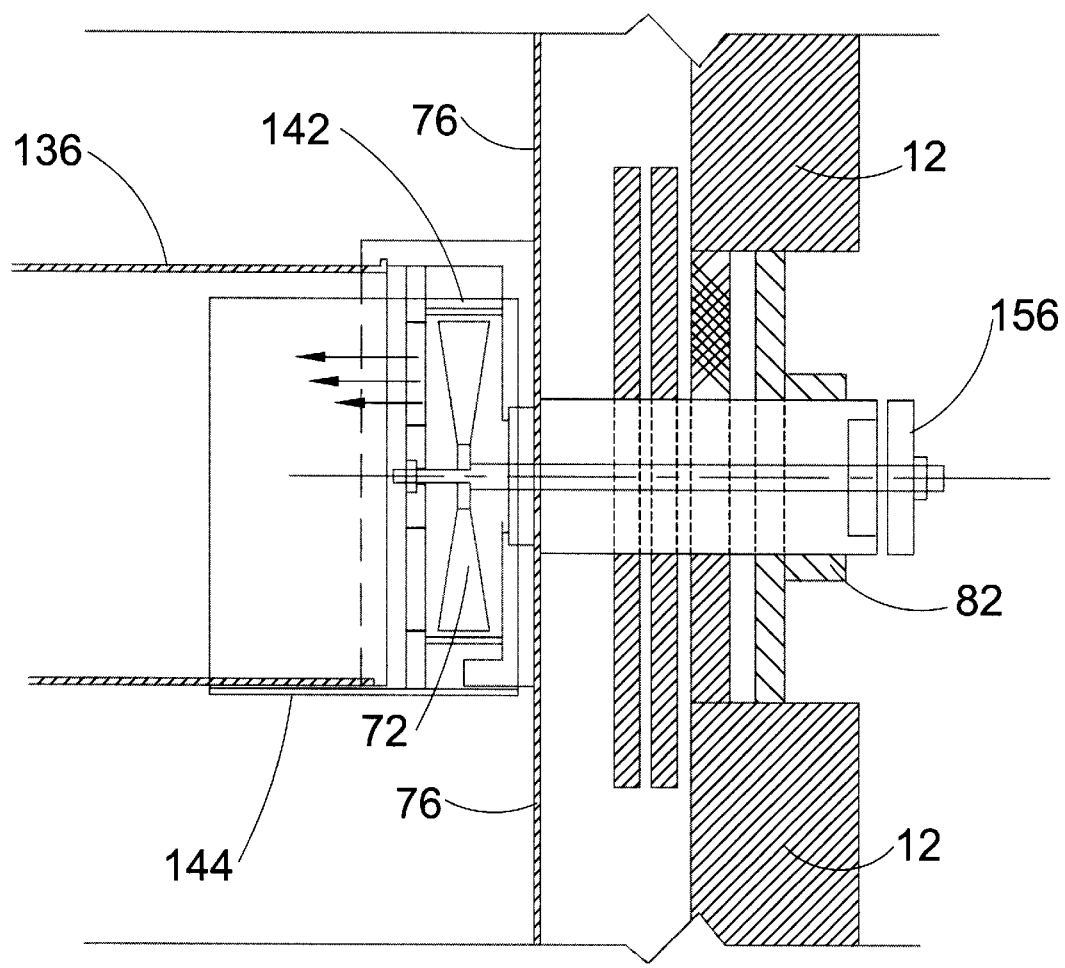
FIG. 17 is an exploded view of the cooling fan mount within the relocatable drive tube having a double ended spindle shaft of the rotational molding oven of the present invention.

FIG. 16 illustrates the drive assembly. As can be seen from this figure, the drive assembly gear box 58 includes the bevel gear 60 connected to the transverse drive shaft 54. The transverse drive shaft 54 extends within and parallel to the drive tube 56. The right-angle drive means 92 transfers the motion of the transverse drive shaft 54 to the connected spindle drive shaft 99. Bevel gear 98 acts as a stabilizer for bevel gear 60 to reduce eccentric loads and provide a smoother operation. The long spindle drive shaft 99 includes the first and second bolt up plates 94 and 96 on an end thereof for connection with the mold 70. The bolt up plates 94 and 96 hold first and second molds in position within the cavity 14. When the drive shaft 54 is rotated by the spindle motor 42, the bevel gear 60 is also caused to rotate. The rotation of the bevel gear 60 rotates both the first and second right angle drive means 92 and 98. The first right angle drive means 92 rotates the spindle drive shaft 99 and bolt up plates 94 and 96. As the molds 70 are connected to the bolt up plates 94 and 96, the molds 70 are caused to rotate therewith. This permits mounting multiple smaller molds 70 in an otherwise large oven The drive tube 136 and the gears are continuously air cooled by a ventilation fan 72 and preferably kept at a temperature below 2001 F. An enlarged view of the ventilation fan 72 is illustrated in FIG. 17. The ventilation fan 72 is located inside the drive tube 136 and is driven by the fan motor 90 mounted on top of the rigid frame 12 through a chain drive system similar to the second drive motor 42 above.

In both cases the entire drive assembly including sprockets, chains, gears and bearings are located outside of the heated oven cavity. This system cost less to build, has lower maintenance costs and requires less maintenance since the parts are not subject to extreme environments.

Within the cavity 14 is the spool 74 (FIG. 4) which acts as a rotational chamber, the edges of which are the side walls of the oven. The edges are connected by the two stay braces 80 and the drive tube 56. The drive tube is a normally rectangular, hollow section connecting the edges of the spool and open to the outside of the oven at each end. The drive tube holds the primary rotation mechanism (x axis). The drive tube is insulated and the inside of the hollow section, being cooled and connected to the ambient air, is considered to be outside of the oven cavity.

The primary axis (the x axis) is driven through a system of chain drive sprockets by the motor 42 located outside of the cavity 14 and a geared shaft which extends into drive tube of the spool. The motor can be controlled by conventional means to stop, change speed and/or change direction.

Figure 9:
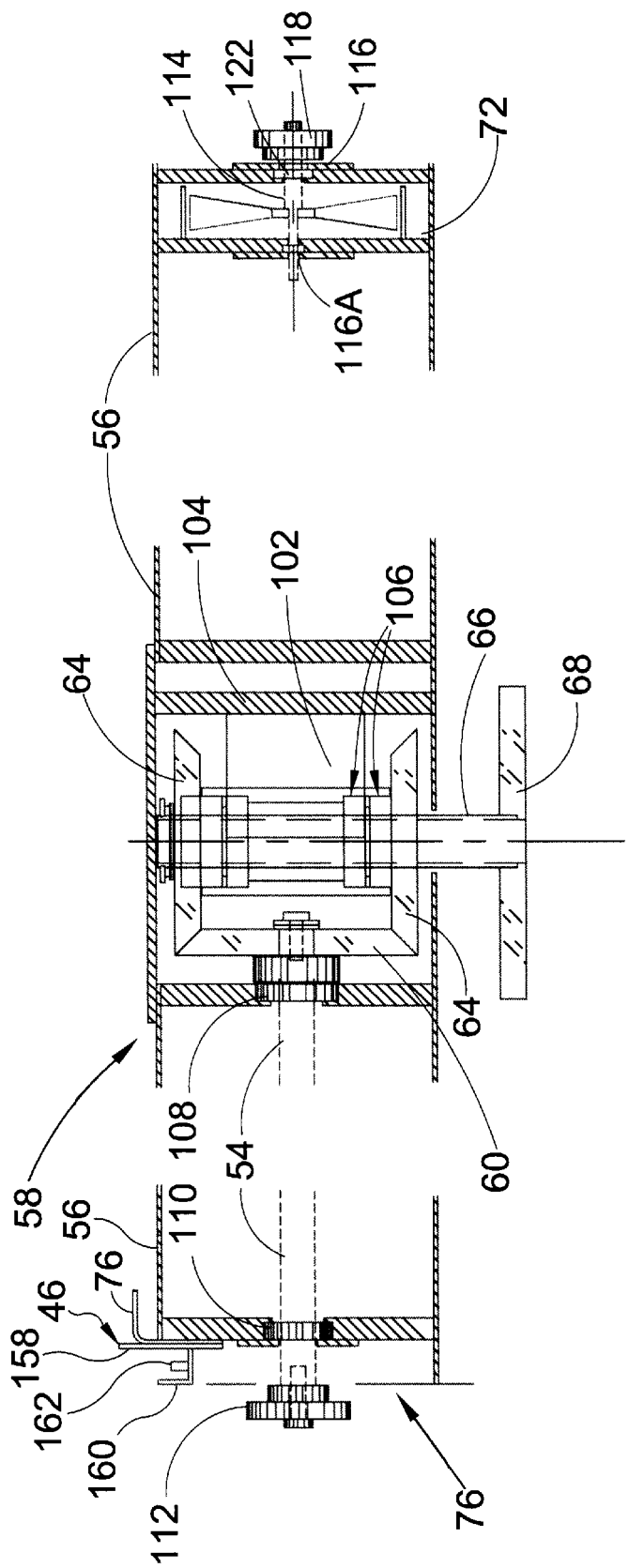
FIG. 9 is an exploded side view of the drive tube assembly of the rotational molding oven of the present invention.

The rotation of the spool assembly, which axis is the secondary axis (the y axis) of rotation of the oven, is driven by a chain drive attached to the perimeter of the spool through drive pin dowels 162 located in perimeter drive channel 160 and seen in FIG. 9. The motor can be controlled by conventional devices for speed change, stop with pause and reversal of direction. By adjusting the rates, times and rotation speeds, the sequence of rotation can be controlled to suit any part and bi-axial, rock and roll and more complicated sequences are achievable.

The invention herein also consists of a process structure which is comprised of a frame 12, a rear shell assembly 164, possibly having an inspection hatch, a top assembly 168, a front panel 170 and a base assembly 166. The interior facing parts of the process structure including the rear panel assembly 164, the front panel assembly 170 with door 20, top assembly 168 and lower plenum 166 along with the drive spool 74 form an insulated chamber, the cavity, 14. The cavity 14 is open in the front and has a door 20 for selectively sealing the cavity 14. The door 20 is fitted with the dual pivot hinges 21 for swinging the door 20 completely clear of the opening. The control panel 19 is attached thereto.

A combustion fan 126 is connected to the combustion burner chamber 16 which is connected by a lower plenum 18 to the inside of the cavity 14. A recirculating air fan 128 is also connected to the lower plenum 18 and to the inside of the cavity 14. The burner chamber 16 contains multiple independently operated gas burners 124 as can be seen in FIG. 2. The top structure includes the exhaust stack 22 with the stack damper 24 positioned therein for controlling pressure in the oven. The top structure also contains the cooling fans and cooling exhaust damper. The cooling exhaust damper 30 is located under fans 28 and 32 and is connected to the cavity 14 by duct 26 and is comprised of two sections. One section under fan 32 handles the intake air, and one section under fan 28 handles the discharge air from the cavity 14.

The configuration and operation of the rotational molding oven 10 of the present invention will now be discussed with reference to all the drawing figures.

The spool 74 contains a drive tube 56 extending transversely through the cavity 14 from first flanged disk 76 to second flanged disk 78. The drive tube 56 includes a drive assembly 57 which includes a gear box 58 having one bevel gear 60, the two right angle bevel gears 64 and the spindle shaft 66 housed in a removable frame 104. The gear box 58 consisting of a spindle shaft 66 with two right angle bevel gears 64 positioned thereon and one bevel gear 60 connected at a right angle to the two bevel gears 64. The one bevel gear 60 drives the two right angle bevel gears 64. A drive support brace 102 is attached to removable frame 104 and rotationally holds the spindle shaft 66 with suitable bearings 106 in the drive tube 56.

The drive shaft 54 travels half the length of the drive tube 56 and is held at the inboard end by bearings 108 and at the outboard end of the drive tube 56 by a radial bearing 110 and has a sprocket 112 at the extreme outer end. At the other end of the drive tube 56 is the drive assembly cooling fan 72 supported on a shaft 114 with bearings 116 and 116A and an outboard drive sprocket 118 in such a manner that the bearing cooling fan 72 when turned, forces outside air into the drive tube 56 to cool the drive assembly 58 and shaft 54.

The drive tube 56 is fixed at either end to the first and second flanged discs 76 and 78, which, with two transverse structural channel members 80 makes a drive spool assembly 74.

The flanged discs 76 and 78 have at their respective centers the short hollow shaft 82 which is supported by main flanged bearings 15 one for each side of the spool and which bearings are fixed to a structural frame 12. The frame 12 is anchored against movement and is, in turn, fixed to the cavity 14. The cavity 14 has a generally cylindrical shape and, with the drive spool assembly 74, forms an oven in which the drive spool assembly 74 is free to rotate about the axis of the cavity 14. The spindle shaft 66 is thus free to rotate about the longitudinal transverse axis of the cavity 14.

Each short hollow shaft 82 holds a double sprocket 50 which is rotationally mounted to the short shaft 82 by a roller bearing 86 and connected by chain 91 to the fan motor 90 on one side and by chain 48 to the second motor 42 on the other side, both motors being fixed to the top assembly 168. Sprocket chains 44 extends from the first motor 40. The double sprocket 50 on the short hollow shaft 82 of the first flanged disk 76 is connected to the drive shaft 56 by chain 52 on one side of the cavity 14. The double sprocket 50 on the short hollow shaft 82 of the second flanged disk 78 is connected to the fan shaft 122 by chain 89 (not shown) on the other side. Thus, the spindle drive motor 42 is engaged with the spindle shaft 66 through drive chains 48 and 52, shaft 56 and bevel gears 60 and 64 and the fan drive motor 90 is engaged with the cooling fan 72 through drive chains 89 and 91 and the fan drive shaft 122 while the spool assembly is free to rotate about its horizontal axis.

The spool drive channel 160 extends around the periphery 46 of the circumference of the flanged disks 76 of the spool drive 74, opening radially outward, and is fixed to the perimeter of the drive spool assembly having dowels 162 embedded at regular intervals along the perimeter to engage the spool drive chain 44. The spool drive chain 44 is connected to spool drive motor 40 via spool drive sprocket 45 such that the spool drive motor 40 rotates the drive spool assembly 74 about the shafts 82 in either direction. The idler sprocket 43 is adjusted to maintain the chain 44 in constant tension to eliminate backlash on motor stops and reversals. An extension of the inside wall of the channel 158 provides a gas seal between the spool and the side wall of the cavity 14.

In order to form an object using the rotational molding oven 10, the mold 70 containing resin therein must be positioned within the cavity 14 and attached to the bolt up plate 68. Once the mold 70 is secured, the user can operate the control panel 19 to begin operation of the oven. The user sets a temperature for heating the rotational molding oven 10 and the mold 70 and resin therein. At this time ignition occurs in the combustion burner chamber 16 to generate heat. The heat passes through the plenum 18 and into the cavity 14 wherein it heats the mold 70 causing the resin to melt. The user may also set the speed and amount of rocking or rotation that will be imparted to the mold 70. The mold is rotated about the horizontal axis of the cavity 14 by the spool driven by the first drive motor 40 and can be rocked and rotated about the axis perpendicular to the above horizontal axis by the spindle driven by the second drive motor 42.

The first drive motor 40 acts on the chain 44 extending around the periphery 46 of the first flanged disk 76 causing the drive spool 74 to rotate. As the drive spool assembly 74 rotates, the drive tube 56 which is connected between the first and second flanged disks 76 and 78 will also rotate about the horizontal axis of the oven. Thus, the gear box 58 containing the drive spindle 66 and attachment plate 68 will rotate causing the mold 70 connected thereto to also rotate. The second drive motor rotates the double sprocket 50 through chain 48 which in turn rotates the drive shaft 56 through chain 52 connected to half of double sprocket 50 and sprocket 112. Drive shaft 56 acts through the bevel gear train 60 and 64 and causes spindle 66 and bolt up plate 68 to rotate. Rotation of the bolt up plate 68 causes the mold 70 to rotate about an axis which is perpendicular to the horizontal axis of the oven. As the mold 70 rotates about these two axes, the resin melted by the heat provided from the combustion chamber 16 is evenly distributed throughout the mold 70. This is required in order to produce an evenly filled mold 70 and thus also produce a useable object.

If the user decides to impart both rocking and rolling motion to the mold 70, the controls to reverse direction of the second motor 42 will be activated. This motor will rotate the spool 74 between predetermined limits, pausing and reversing direction as each limit is reached. The spool 74 will, therefore, never complete a full revolution in either direction, but will have a rocking motion. The spindle 66 will continue to be rotated throughout the process. During the rotation of the mold 70, the cooling air fan 72 is constantly cooling the elements within the gear box 58 to prevent overheating thereof and improve operation of the rotating mechanism.

As the mold is caused to rotate by the first and second motors 40 and 42, the heat generated in the combustion chamber is mixed with recirculation gas and is introduced to the cavity 14. The hot gas is returned through the recirculation fan 128 for reheating and reuse. Combustion air is introduced to the combustion chamber to maintain combustion of the gas injected by burners 16. The accumulation of gases is vented through the exhaust stack 22 and the rate of venting is controlled by damper 24 in the stack 22 to maintain a small positive pressure in the cavity 14. A small positive pressure in cavity 14 prevents drafts from entering the cavity and causing localized undesirable cooling.

Once the heating cycle is finished, the cooling cycle begins. During the cooling cycle, the cooling fans 28 and 32 are turned on and the damper 30 within the short duct 26 is opened. The cooling fan 32 thus provides cool air to the inside of the cavity 14. To further cool the mold 70, a cool water mist is sprayed through the nozzle 36. Liquid is provided to the nozzle from a water source by the water pump 34. Fan 28 extracts the moisture laden warmed air from the cavity. Once the mold is cooled and hardened it is removed from the cavity 14 by opening up the door 20 and opening the mold 70 at its parting line without removing the mold from the bolt up plate 68. The operation is similar when the drive tube 56 is positioned in a central portion of the cavity 14 and more than one mold 70 is positioned within the cavity 14.and The cost to manufacture these ovens is generally low and often several rotational molding ovens can be purchased for the same cost as one larger turret or shuttle style system. The rotational molding ovens as described herein do not have to be identical. A mix of sizes, configurations and features will permit a variety of molds to be run at the same time with only a few oven operating. This saves on initial capital investment.

The only opening in the rotational molding oven 10 during the process cycle is the perimeter gap between the rotating spool 74 and the oven shell. An overlapping perimeter ring seal 158 is provided. An access hatch is located to the rear of the process cavity and is latched and has perimeter seal with gasket material for a no-leakage fit. The door also closes on a gasket seal and has secure latches.

Limited mold travel (no vertical translation) accomplished by the oven of the present invention makes both loading and unloading easier. The mold can be started and stopped at the same point each time. Permanent platforms and jibs can be made for servicing large ovens with heavy molded pieces. This feature permits the use of a smaller oven with lower required head space, smaller footprint, improved thermal efficiency, better hot gas and cold air distributions than existing or previous configurations. This translates into a smaller investment in building, lower energy cost and improved quality control.

The rotational molding oven 10 provides positive control of rocking action by way of travel displacement sensors and limit switches which act and extend along the drive path. The drive motors 40 and 42 may be fitted with an electric brake 100 to ensure quick stopping and therefore positive positioning and speed reducers 101 to control rotation speed. Models that use cams, pneumatic or hydraulic cylinders, gear drives or eccentric motor driven rock drives have large over-travel and inaccurate positioning and cannot perform these operations accurately. Bi-directional control of rotational travel about the y axis provides control of the rock angle for each mold. This travel can differ from one mold to the next, each having a different angle and duration of dwell, or speed of travel. It is possible with the rotational molding oven 10 to operate as either a rock and roll oven through any angle or as a biaxial oven with variable rotation drive motor speeds. This provides short excursions to larger rock angles to assist dislocation of trapped resins from pockets within some molds and guarantee resin movement as and when required. This extra degree of control improves and optimizes resin distribution and therefore improves quality control and reduces the number of costly rejects. The rotational molding oven 10 is able to handle any and all rotational molds at their optimum process parameters.

By using the same cavity for both heating and cooling, all cycles start from the same cold state with the same preheat cycle—this consistent and predictable thermal cycle reduces part variations and rejects.

Another change is that the drive tube 56 and gear box 58 are relocateable and can be positioned on the periphery or at the center of the cavity 14. If a large mold 70 is to be mounted, the drive tube 56 can be dismounted from the center and remounted at the periphery. Two configurations for the drive tube 56 eliminates the need for additional (larger) ovens. Moving the drive tube 56 with its contained bevel gear train and spindles, eliminates the need to stock multiple drive tubes.

The rotational molding oven 10 of the present invention has numerous features and benefits. Firstly, both rotational axes of the oven intersect at the center of the oven cavity resulting in a smaller cavity and higher gas recirculation rates for improved heat transfer. This causes the energy costs of the oven to be lower and provides a controlled wall thickness. The position of the rock axis at the center of the oven further provides for larger mold capacity and a lower investment required for the process building floor space.

Secondly, the motor drives for the oven are located outside the heated cavity and all other maintainable devices are easily accessed from the outside of the oven. The placement of the motors outside the cavity decreases the wear rate of the motor, thereby decreasing maintenance costs and lost production from downtime of the machine. Furthermore, the life expectancy of the machine is increased.

Thirdly, the multi-stage combustion chamber is located in the underside of the unit for providing clean uniformly distributed combustion gas. This improves the control of the oven temperature, the heat distribution and allows the thickness of the walls to be decreased. This will also eliminates the possibility of burning the mold.

Fourthly, the single cavity-dual cycle oven removes the need for any handling of the mold between process cycles and eliminates the need for special mold handlers. This reduces the labor costs involved in handling molds, the equipment costs for mold handling and the equipment costs for the oven. The real estate requirement for oven installation is reduced by the use of the single cavity-dual cycle oven.

Fifthly, the single cavity opening is easily sealed thereby limiting air leakage. This will permit greater control of cavity pressure and a reduction of heat losses. Furthermore, this will improve the thermal cycle control of the oven and lower energy costs.

Sixthly, the hot gas recirculating fan cycles gases through the burner and improves combustion quality. This improves the control of the oven interior to neutral pressure thereby resulting in lower leakage and no cold spots or after-burn. The high recirculation gas velocity improves convective heat transfer rate and reduces mold heating variances due to mold shape. The high recirculation gas velocity improves temperature uniformity within the cavity, reducing cold spots and hot spots. The use of this fan will reduce the total gas consumption, reduce the possibility of burning the molds and provide better quality control.

Seventh, the contoured door eliminates cold corners and improves operators ability to reach into the oven. This allows the mold clamps and attachments to be readily accessed by the operator for faster turnaround times. The door also swings out of the way to thereby provide clear and open access to the cavity. The benefits of this door include more uniform heating, lower process labor consumption, safe mold access/removal.

Eighthly, the present invention utilizes small motor sizes because all molds are balanced before installation and the total rotated mass is lower since only one set of molds is driven per oven. This provides lower initial cost and lower maintenance costs without increased failure frequency as well as providing higher overall productivity and lower electrical operating costs.

Ninthly, the single cavity operation allows production systems consisting of multiple ovens to be assembled with ovens of different sizes thereby providing greater molding capability and flexibility. This will improve the manufacturing scheduling flexibility as well as increase the service factor on molds.

Tenthly, in the single cavity/single mold operation, balancing molds for quiet smooth rotation after installation is not required. Furthermore, a schedule for best compromised oven operation is not required as each oven can run with different cycle parameters, each set of parameters being suited to best production for each individual mold. This allows set-up costs to be minimized, scheduling of production to be a lot easier and the quality of the parts produced to be improved.

Eleventh, the overall cost to build a production facility with single cavity ovens in accordance with the present invention is competitive with the costs for turret systems without a loss of the features.

Twelfth, the cost of installation of utilities to the present invention is significantly less than for large systems since motors are small and equipment is not heavy. This system breaks down into light weight modules for easy shipping and installation. Very little set-up time and specialized labor is required. The oven of the present invention thus requires a low initial investment on utilities, minimizes the delay to full production as one unit may be started while others are being installed.

Thirteenth, the roll (primary) drive acts through the drive train which acts through the center of roll rotation to enable fixed motor mount without commutators thus eliminating the need for commutators.

Fourteenth, the roll drive acts through a drive tube located either at the periphery of the main spool with single spindle operation or through the center of the oven having dual, mutually opposed spindle arms and attached molds. This provides the full oven volume to be available for molds during single mold per oven operation and also permits conversion of the oven cavity to handle two or more molds at one time.

Fifteenth, the roll drive acts through a drive tube located at the center of the oven, the drive tube being able to be unbolted and reattached at the periphery of the spool to accommodate large molds. Thus one drive can service all molds and the change over time is small compared to purchase of additional ovens.

Sixteenth, the roll shaft in the drive tube is straight and connected to ambient air at each end, the drive tube having a dedicated ventilation fan. Thus, there are no turns or bends in the drive tube and constant ventilation is possible which maintains close to ambient air temperatures in the drive tube.

Finally the oven is constructed in five discrete shapes, which, with the addition of the main bearing plates, can be shipped separately and then quickly assembled to form the oven. This saves in construction time and labor on site, transportation costs to the site and permits operation of the oven soon after arrival on site. The control wiring is simplified and less costly, the freight is lower and the value to the customer begins soon after the purchase, minimizing carrying costs.

From the above description it can be seen that the rotational molding oven of the present invention is able to overcome the shortcomings of prior art devices by providing a rotational molding oven which is able to operate in either a bi-axial or rock and roll mode or both to optimize the quality control of a molded product. The rotational molding oven is able to both heat and cool the molds positioned within a cavity thereof wherein all cycles begin from the same start-up state with the same preheat cycle thus providing a consistent mechanical and thermal cycles which reduce the part to part variance and number of rejects produced. The rotational molding oven is able to control the sequence and speed of rotation of the mold can be controlled to suit the particular object being formed. The rotational molding oven is also able to provide a short time period of extra heat input for the preheat cycle. The rotational molding oven has convective hot gas recirculation for improved heat transfer rate and temperature uniformity and allows for close control of temperatures to a predetermined, variable temperature profile throughout the heating cycle.

The rotational molding oven includes a drive means for both the primary and secondary axes of rotation located outside of the oven and drive trains to connect the drive means with their respective shafts, wherein the drive trains are entirely contained outside of the heated cavity to facilitate maintenance on the oven and minimize exposure of the drive assembly to extreme environments such as that found within the cavity of the oven. A burner combustion chamber is located external to and to the underside of the oven cavity, the burner chamber being capable of operating on a variety of fuels and provides hot gasses to a plenum located below the cavity. The rotational molding oven also includes an exhaust stack having a volume control damper for controlling cavity pressure and a combustion gas re-circulating fan connected to the combustion chamber to optimize combustion and reduce tramp air infiltration into the cavity.

The cavity of the rotational molding oven is generally comprised of an insulated spool inside an insulated stationary shell, within which spool is contained, the primary rotational drive aligned with the primary axis of rotation of the mold and which spool is itself rotated to provide the secondary access of rotation.

The drive train for the primary axis drives a sprocket acting at the center of the secondary axis, rotational motion of the sprocket is transferred to a second sprocket connected by a chain to a sprocket attached to a drive shaft acting within a drive tube located at the perimeter of the spool. The drive shaft is connected to the primary drive shaft through a set of bevel gears housed in the drive tube and which drive tube is insulated and ventilated to maintain ambient conditions at all times. In one configuration the drive tube is located at the periphery of the spool and contains one spindle for one mold. In another configuration the drive tube is located at the spool center aligned with the axis of the spool and containing two opposing spindles to drive two molds simultaneously. The drive means for the secondary axis drives a chain through an idler sprocket to the perimeter of spool where the chain engages drive pins and effects control over the rotational motion of the spool and wherein the drive can be stopped, started and reversed at will to alter the nature of the molding process.

The rotational molding oven further includes a drive means for a cooling fan located on top of the oven and driving a sprocket acting at the center of the secondary axis. The rotational motion of the sprocket is transferred to a second sprocket connected by a chain to a sprocket attached to a drive shaft which acts through a drive tube located at the perimeter of the spool. The drive shaft is also connected to a cooling fan located within the insulated drive tube and which fan maintains the conditions within the drive tube close to the ambient temperatures. The rotational molding oven is able to support a mold at the center and rotating the mold in center-less fashion about two axes of rotation at the center of the oven wherein the oven will be least possible size to house the rotating mold. Furthermore, the rotational molding oven of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A rotational molding oven for forming an object from a mold containing resin therein, said rotational molding oven comprising:
   a) a cavity for receiving the mold therein;
   b) a combustion chamber including a recirculating fan for providing heat to an inside of said cavity;
   c) a spool including first and second flanged disks, rotatively positioned within said cavity;
   d) a drive tube and drive extending between said first and second flanged disks, said drive having means for engaging the mold when positioned in said cavity;
   e) a second motor positioned outside said cavity and connected to said drive tube and drive for rotating said mold; and
   f) a first motor positioned outside said cavity for rotating said spool, wherein the heat provided to said cavity by said combustion chamber melts the resin within the mold and the rotating of the spool by said first motor and rotating of the mold by said second motor causes the melted resin to be evenly distributed throughout the mold.

2. The rotational molding oven as recited in claim 1, wherein said drive tube is positioned at a peripheral edge of said spool.

3. The rotational molding oven as recited in claim 1, wherein said drive tube is positioned at a center of said spool with drive means for multiple molds positioned about the center of said spool and said drive tube.

4. The rotational molding oven as recited in claim 1, further comprising an exhaust duct extending from a top of said cavity for releasing combusted gases from within said cavity and a damper positioned within said exhaust duct for controlling a pressure within said cavity.

5. The rotational molding oven as recited in claim 1, further comprising a damper located at the top part of said cavity and a duct connected between said damper and said cavity for providing a conduit for cooling air to be injected into said cavity by a cooling air injection fan and expelled from said cavity by a cooling air exhaust fan which work together to circulate cooling air through said cavity.

6. The rotational molding oven as recited in claim 1, wherein said first motor includes a chain extending from said first motor and about a periphery of said spool for rotating said spool under the control of said first motor.

7. The rotational molding oven as recited in claim 1, wherein said drive tube includes a drive shaft and a gear box connected to said drive shaft, said gear box engaging the mold and said drive shaft connected to and rotated by said second motor, said drive shaft imparting its rotational motion to said gear box for rotating the mold.

8. The rotational molding oven as recited in claim 1, wherein said drive tube further includes a fan for providing cool air to said gear box.

9. The rotational molding oven as recited in claim 7, wherein said gear box includes:
   a) a bevel gear connected to said drive shaft;
   b) a right angle gear connected to and rotated by said bevel gear;
   c) a spindle connected to and rotated by said right angle gear; and
   d) a bolt up plate connected to and rotated by said spindle, said bolt up plate engaging and rotating the mold.

10. The rotational molding oven as recited in claim 7, wherein said gear box includes:
    e) a bevel gear connected to said drive shaft;
    f) a first right angle gear connected to and rotated by said bevel gear;
    g) a first spindle connected to and rotated by said first right angle gear which spindle extends outward from both sides of the drive tube;
    h) a first and second bolt up plate connected to and rotated by said first spindle, said first bolt up plate engaging and rotating a first and second mold;
    i) a second right angle gear connected to and rotated by said bevel gear, said second right angle gear being connected to a side of said bevel gear opposite said first right angle gear wherein the second bevel gear adds stability to the gear train.

11. The rotational molding oven as recited in claim 1, further comprising a nozzle for spraying a cool mist into said cavity upon completion of heating the mold and a pump to power said nozzle and a motor to drive said pump.

12. The rotational molding oven as recited in claim 8, further comprising a fan motor positioned outside of said cavity for powering said fan.

13. The rotational molding oven as recited in claim 1, wherein said cavity includes a first open side for insertion of the mold therein, and said oven includes a door pivotally connected to said cavity for providing selected access to said cavity through said first open side.

14. The rotational molding oven as recited in claim 13, further comprising a control panel positioned on said door for controlling operation of said oven.

15. The rotational molding oven as recited in claim 14, wherein said control panel controls operation of any of said first motor, second motor, recirculation fan motor, combustion air fan motor, cooling exhaust fan, cooling injection fan exhaust damper and pump and nozzle.

16. The rotational molding oven as recited in claim 1, wherein said combustion chamber includes a plurality of gas burners for generating heat to be supplied to said cavity and a fan to introduce fresh air to the combustion chamber to burn the available fuel.

17. The rotational molding oven as recited in claim 1, wherein said combustion chamber is capable of operating on a variety of fuels.

18. The rotational molding oven as recited in claim 1, further comprising a fan which draws gases from the cavity and forces recirculation of gases through the combustion chamber back into the oven cavity.

* * * * *